(12) United States Patent
Gerson et al.

(10) Patent No.: US 11,678,706 B2
(45) Date of Patent: *Jun. 20, 2023

(54) KNITTED TEXTILE METHODS

(71) Applicant: Global Apparel Partners Inc., Malibu, CA (US)

(72) Inventors: Garrett Li Gerson, Malibu, CA (US); Avi N. Reichental, Carpenteria, CA (US)

(73) Assignee: Global Apparel Partners Inc., Malibu, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,867

(22) Filed: Aug. 10, 2022

(65) Prior Publication Data

US 2022/0378132 A1 Dec. 1, 2022

Related U.S. Application Data

(63) Continuation of application No. 16/683,102, filed on Nov. 13, 2019, now Pat. No. 11,478,033, which is a
(Continued)

(51) Int. Cl.
*A41H 3/00* (2006.01)
*G06F 30/00* (2020.01)
*G06F 113/12* (2020.01)

(52) U.S. Cl.
CPC ............. *A41H 3/007* (2013.01); *G06F 30/00* (2020.01); *G06F 2113/12* (2020.01)

(58) Field of Classification Search
CPC ...... A41H 3/007; G06F 30/00; G06F 2113/12
See application file for complete search history.

(56) References Cited

U.S. PATENT DOCUMENTS

| 4,527,402 A | 7/1985 | Swallow et al. |
| 4,835,699 A | 5/1989 | Mallard |

(Continued)

FOREIGN PATENT DOCUMENTS

| WO | 2017213539 A1 | 12/2017 |
| WO | 2017220638 A1 | 12/2017 |

OTHER PUBLICATIONS

"3D Fashion Design Software by Browzwear-V-Stitcher," website printout from http://www.browzwear.com/products/v-stitcher, retrieved on Feb. 25, 2014, 2 pages.

(Continued)

*Primary Examiner* — Xin Sheng
(74) *Attorney, Agent, or Firm* — Ascenda Law Group, PC

(57) ABSTRACT

Custom-fit versions of knitted articles are produced according to digital representations of objects for which the articles are to be manufactured. The digital representations, optionally augmented by surface fitting algorithms, allow for accurate scaling of pattern-specified stitch counts for pattern elements representing the article taking into account wales and courses densities for the material(s) from which the article is to be made. Displayed dimensionally-accurate representations of the custom-fit articles allow for user-specified style and fit preferences to be made and a final digital pattern of the article to be produced. Machine instructions representing pattern pieces to be knitted are automatically produced from the final digital pattern of the article for a target computerized knitting machine and the custom-fit article then manufactured according to the machine instructions.

20 Claims, 15 Drawing Sheets

Related U.S. Application Data continuation-in-part of application No. 15/831,296, filed on Dec. 4, 2017, now Pat. No. 10,650,429, which is a continuation-in-part of application No. 15/344,535, filed on Nov. 6, 2016, now Pat. No. 9,858,606.

(56) References Cited

U.S. PATENT DOCUMENTS

| | | | |
|---|---|---|---|
| 4,916,624 | A | 4/1990 | Collins et al. |
| 4,916,634 | A | 4/1990 | Collins et al. |
| 4,926,344 | A | 5/1990 | Collins et al. |
| 4,964,031 | A | 10/1990 | Gotoh |
| 5,046,013 | A | 9/1991 | Ueda et al. |
| 5,124,928 | A | 6/1992 | Aemmer |
| 5,517,404 | A | 5/1996 | Biber et al. |
| 6,163,733 | A | 12/2000 | Rubel |
| 6,205,370 | B1 | 3/2001 | Blaimschein et al. |
| 6,499,513 | B1 | 12/2002 | Couch |
| 6,516,240 | B2 | 2/2003 | Ramsey et al. |
| 6,520,057 | B1 | 2/2003 | Steadman |
| 6,546,309 | B1 | 4/2003 | Gazzuolo |
| 6,564,118 | B1 | 5/2003 | Swab |
| 6,611,730 | B1 | 8/2003 | Stoll et al. |
| 6,665,577 | B2 | 12/2003 | Onyshkevych et al. |
| 6,907,310 | B2 | 6/2005 | Gardner et al. |
| 6,968,075 | B1 | 11/2005 | Chang |
| 7,260,445 | B2 | 8/2007 | Weiser et al. |
| 7,338,709 | B1* | 3/2008 | Wada ............... G08B 13/2408 57/223 |
| 7,479,956 | B2 | 1/2009 | Shaw-Weeks |
| 7,657,340 | B2 | 2/2010 | Lind |
| 7,663,648 | B1 | 2/2010 | Saldanha et al. |
| 8,307,560 | B2 | 11/2012 | Tulin |
| 8,348,371 | B2 | 1/2013 | Mcdowell et al. |
| 8,660,902 | B2 | 2/2014 | Coulter |
| 9,858,606 | B1* | 1/2018 | Mar ............... G06Q 10/0833 |
| 2001/0026272 | A1 | 10/2001 | Feld et al. |
| 2002/0002416 | A1 | 1/2002 | Herman, Jr. |
| 2002/0002938 | A1 | 1/2002 | Alberts et al. |
| 2002/0059248 | A1 | 5/2002 | Farchione |
| 2002/0099583 | A1 | 7/2002 | Matusek et al. |
| 2002/0138170 | A1 | 9/2002 | Onyshkevych et al. |
| 2003/0011590 | A1 | 1/2003 | Kung et al. |
| 2004/0049309 | A1 | 3/2004 | Gardner et al. |
| 2004/0078285 | A1 | 4/2004 | Bijvoet |
| 2006/0015207 | A1 | 1/2006 | Weiser et al. |
| 2006/0190122 | A1 | 8/2006 | Loeb |
| 2007/0005174 | A1 | 1/2007 | Thomas |
| 2008/0228312 | A1 | 9/2008 | Dickerson |
| 2008/0312765 | A1 | 12/2008 | Gardiner et al. |
| 2009/0222127 | A1 | 9/2009 | Lind |
| 2010/0228646 | A1 | 9/2010 | Heidel |
| 2012/0030928 | A1 | 2/2012 | Park et al. |
| 2013/0151382 | A1* | 6/2013 | Fuller ............... G06Q 50/01 705/27.2 |
| 2014/0040041 | A1* | 2/2014 | Ohnemus ........... G06Q 30/0627 705/14.66 |
| 2014/0277683 | A1 | 9/2014 | Gupta et al. |
| 2015/0332366 | A1 | 11/2015 | Ginocchi |
| 2017/0220029 | A1 | 8/2017 | Alun-Jones et al. |
| 2017/0258164 | A1 | 9/2017 | Barnet et al. |
| 2017/0273383 | A1 | 9/2017 | deGuzman et al. |
| 2017/0309075 | A1 | 10/2017 | Watts et al. |
| 2017/0364982 | A1 | 12/2017 | Lee |
| 2018/0025547 | A1 | 1/2018 | Alun-Jones et al. |
| 2018/0042322 | A1 | 2/2018 | Weiler et al. |
| 2019/0368084 | A1 | 12/2019 | Alun-Jones et al. |

OTHER PUBLICATIONS

"3D Fashion Design Software by Browzwear-V-Styler," website printout from http://wwbrowzwear.com/products/v-styler, retrieved on Feb. 25, 2014, 2 pages.

"3D Suite, Create Garments, Fit to Avatar and Animate," website printout from http://www.optitex.com/en/3D-Suite-Create-Garments-Fit-to-Avatar-Animate, retrieved on Feb. 25, 2014, 3 pages.

"Baxter", Rethink Robotics, Baxter product datasheet, Sep. 2012, 3 pages.

"My Virtual Model—Technology that Outfits," website printout from http://corpo.myvirtualmodeLcom/gallery.html, retrieved on Feb. 25, 2014, 3 pages.

Ashdown; et al., "A study of automated custom fit: Readiness of the Technology for the apparel Industry", Clothing and Textiles Research Journal (2006), 24(2):121-136.

International Search Report and Written Opinion dated Jul. 16, 2018, from the ISA/US, for International Patent Application No. PCT/US18/00100 (filed Mar. 16, 2018), 9 pages.

Kaspar; et al., "Knitting Skeletons: A Computer-Aided Design Tool for Shaping and Patterning of Knitted Garments", Cornell University (Jul. 31, 2019), arXiv:1904.05681v2, 19 pages.

Narayanan; et al., "Automatic Machine Knitting of 3D Meshes", ACM Transactions on Graphics (Jan. 2018), 1 (1), Article 1, 15 pages.

Narayanan; et al., "Visual Knitting Machine Programming", ACM Trans. Graph (Jul. 2019), 38(4), Article 63, 13 pages.

Siyu, E., "Evaluation of Visible and Invisible Fiducial Markers for Clothing Tracking," Electrical Engineering and Computer Sciences, University of California at Berkeley, Jun. 1, 2012, 21 pages.

Wang; et al., "Design Automation for Customized Apparel Products", Computer-Aided Design (2005), 37(7):675-691.

\* cited by examiner

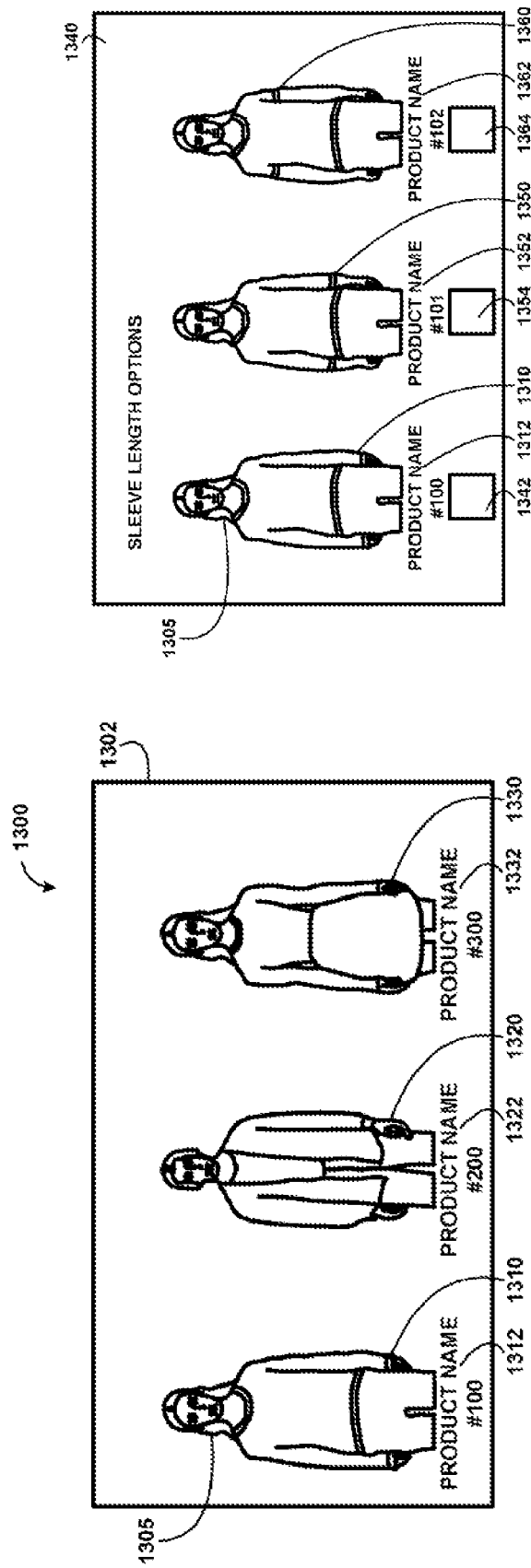

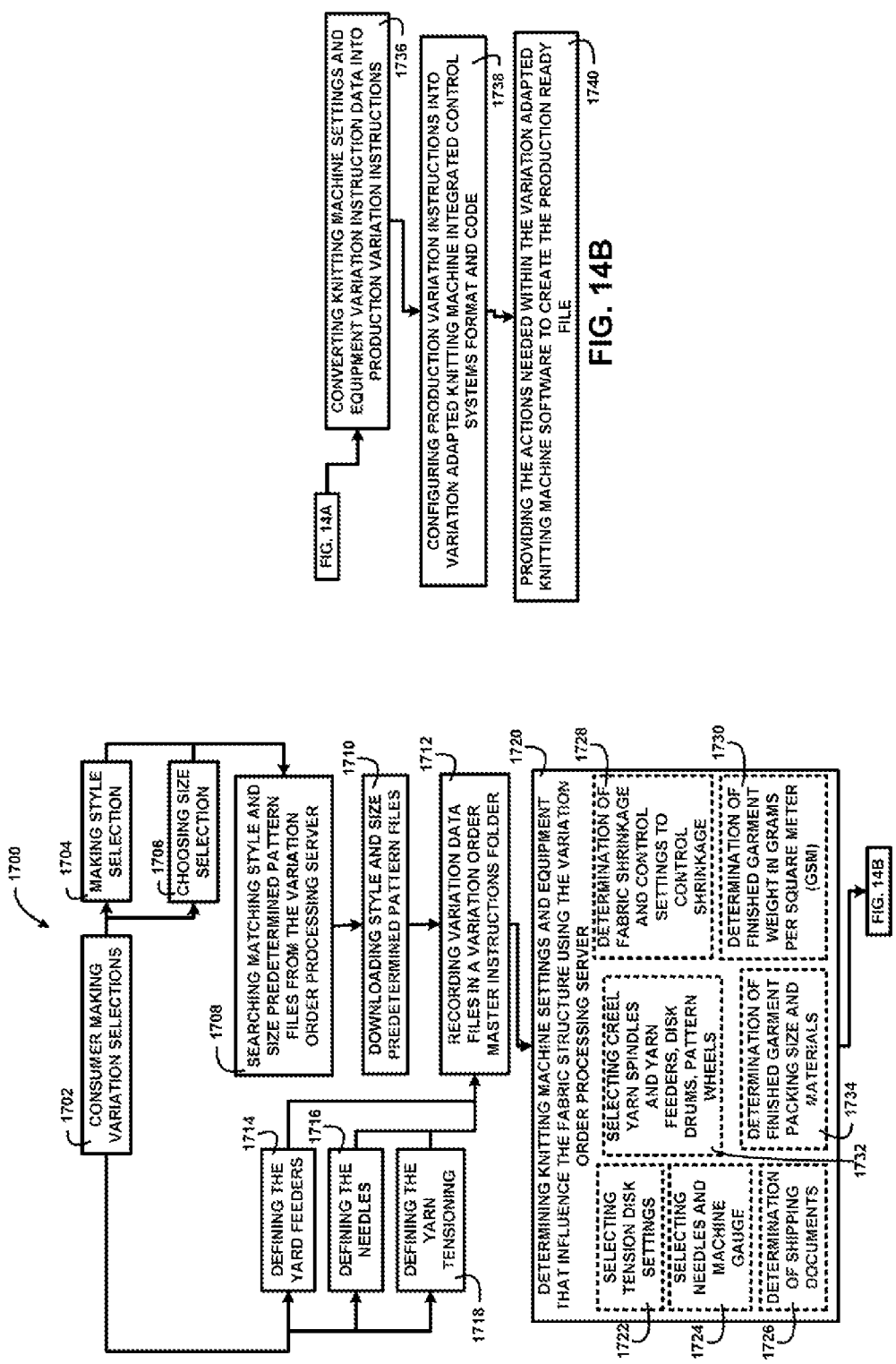

KNITTED TEXTILE METHODS

CROSS-REFERENCE TO RELATED APPLICATIONS

This application is a Continuation of U.S. application Ser. No. 16/683,102, filed Nov. 13, 2019, now U.S. Pat. No. 11,478,033, which is a Continuation-In-Part of U.S. application Ser. No. 15/831,296, filed Dec. 4, 2017, now U.S. Pat. No. 10,650,429, which is a Continuation-In-Part of U.S. application Ser. No. 15/344,535, filed Nov. 6, 2016, now U.S. Pat. No. 9,858,606, each of which is incorporated herein by reference.

FIELD OF THE INVENTION

The present application relates to knitted textile methods and systems and, in particular, to processes for producing a custom-fit version of a knitted article.

BACKGROUND

Garments and other fabric-based articles are often manufactured in several predetermined sizes and shapes according to individual manufacturers' ideas of what will be suitable for a mass market of consumers or applications. For example, garments are often produced in sizes based on a set of standards widely used throughout the apparel industry. But these standards vary from country to country and producer to producer so that consumers cannot be assured that a reasonable fit of one manufacturer's garments will readily translate to the fit of another's for a given specified size. The situation is even worse for non-garment articles, where few if any standardized sizes are used between manufacturers and consumers are forced to try and best-fit particular objects into different manufacturer's prefabricated articles.

SUMMARY OF THE INVENTION

A process for producing a custom-fit version of a knitted article, for example a garment or other knitted article involves collecting information regarding the custom-fit article itself and the material from which it is to be manufactured. Accordingly, a control unit receives information specifying the article to be custom-knitted and one or more materials from which the article is to be custom-knitted. Customization of the knitted article is achieved using a digital representation of the object, e.g., as produced from a scan of the object, images of the object, or other means. For some applications, a digital representation of the object produced from a scan will be sufficiently accurate to create the custom-fit article, but in other cases, the scan data may be augmented, e.g., using surface fitting algorithms, to process a smooth surface digital representation of the subject object.

Various measurements are extracted from the digital representation of the object and stitch counts for corresponding pattern elements representing the article are automatically produced by scaling pattern-specified stitch counts and specified wales and courses densities for the material(s) from which the article is to be made. Thus, adjustments in the shape and fit of the article are made to accommodate the actual shape and size of the object. The result is a digital pattern representing the article which is customized to the object.

Optionally, a dimensionally-accurate three-dimensional representation of a custom-fit version of the article according to the digital pattern representing the article may be displayed to a user. In such cases, as style and fit preferences for the article are varied through user interaction with the three-dimensional representation, the digital pattern representing the article which is customized to the object is iteratively updated and the dimensionally-accurate 3D representation of the article varied on-screen accordingly. The end result is a final digital pattern of the article being produced. From that final digital pattern of the article, machine instructions representing one or more pattern pieces to be knitted to create the custom-fit version of the article are automatically produced by converting stitch counts of the final digital pattern of the article to knitting sequences for a target computerized knitting machine. The custom-fit version of the article may then be manufactured by the computerized knitting machine according to the machine instructions.

These and further features of the present invention are described in greater detail below, with reference to the accompanying drawings.

BRIEF DESCRIPTION OF THE DRAWINGS

The present invention is illustrated by way of example, and not limitation, in the figures of the accompanying drawings, in which:

FIG. 5 illustrates an entity scanned by the scanner according to an example embodiment of the present invention.

FIGS. 11A, 11B, 12A through 12F, and 13A through 13D illustrate a set of screen shots used in ordering a customized knitted product according to an embodiment of the present invention.

FIGS. 14A and 14B illustrate an example of customization processing according to an embodiment of the present invention.

FIG. 15 illustrates an example of knitted product processing according to an embodiment of the present invention.

DETAILED DESCRIPTION

Figure 2:
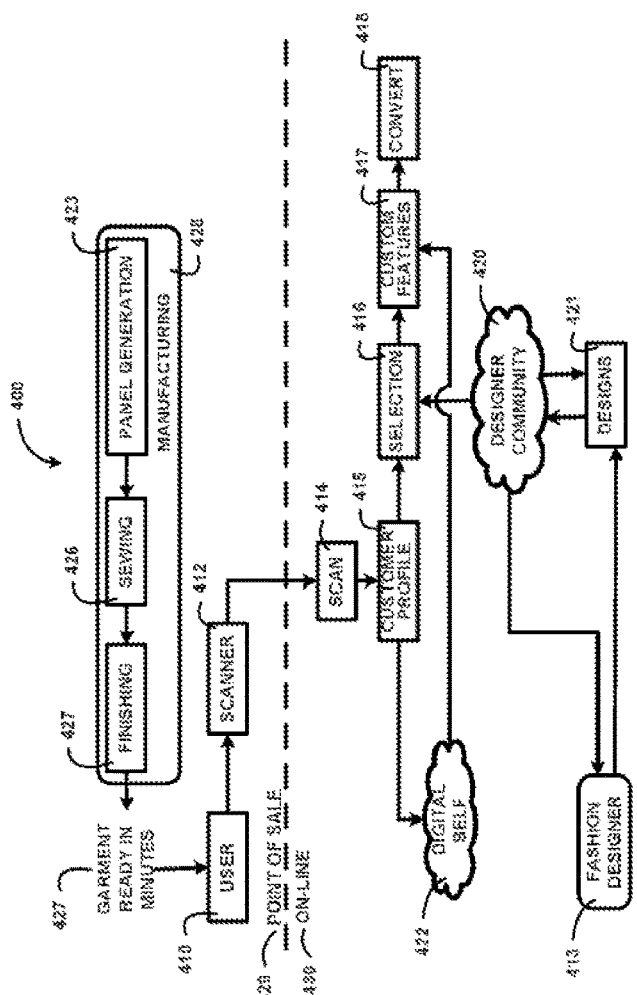
FIG. 2 illustrates a flow diagram of a knitting process according to an embodiment of the present invention.

In one embodiment, the present invention provides a process for producing a custom-fit version of a knitted article, for example a garment or other knitted article. Knitted articles for which the present invention has application are many and varied and include, but are not necessarily limited to garments; vehicle interiors, headliners, seats, door panels, exterior panels, etc.; furniture and furniture covers; footwear, bags (backpacks, travel cases, tablet cases, etc.); hats, and other headwear, e.g., helmets and/or helmet liners; tapestries; straps, undergarments, e.g., corsets; medical devices such as braces, etc.; and gloves. Thus, the term article as used herein refers to a broad range of potential items.

At the outset, information regarding the custom-fit article itself and the material from which it is to be manufactured is required. Hence, a control unit receives information specifying the article to be custom-knitted and one or more materials from which the article is to be custom-knitted. The specification may be made in any of a variety of ways, for example, selection from menu choices, specification in natural language fashion (to be later converted), specification through image analysis, and so on. In some embodiments, the object or individual for which the article is to be fashioned is scanned, e.g., using a structured white light scanner, a laser scanner, time of flight scanner, a thermal scanner, a millimeter wave or other radio frequency scanner, an ultrasonic scanner, etc., or photographed, and a digital representation of the object or individual is created from the scanner output/photograph. Note, in some cases, the article will require fashioning from specified material(s), hence, specification of the article itself will implicitly include specification of the material from which it is to be fabricated so although, in general, these two selections are required, one selection may implicitly define or include the other.

In cases where the subject object to which the knitted article is to be fitted is scanned, and a digital representation of the object is produced from that scan, often, depending on the kind of scanner employed, the scan will produce a three dimensional (3D) point cloud data set representing the scanned object, and that data set can be processed to produce a polygonal mesh representing the surface of the scanned object. In other cases, two-dimensional (2D) scan data in the form of images may be captured, where the images include fiducial markers at multiple points on the surface of the scanned article. The image data may then be converted to a digital representation of the object, that is a polygonal mesh representing the surface of the scanned object. The digital representation of the object is preferably saved, e.g., as a component of an object profile, for later use.

For some applications, the saved digital representation of the object will be sufficient, in terms of its accuracy in representing the true dimensions and shapes of scanned object, to produce a custom-fit version of the knitted article. In other applications, however, it may not be. For example, if the custom fit article is to be a cover for a sofa or a sweater for an individual, scan data produced by a structured white light scanner, laser scanner, time of flight scanner, or other commonly used 3D scanner that is processed to produce a polygonal mesh may provide sufficient detail for accurately dimensioning the custom-fit cover or sweater. On the other hand, if the custom fit article is to be a medical device such as a compression garment, brace, or even a net for cardiac support, then a polygonal mesh produced from the scan data may not provide sufficient dimensional accuracy. In such cases, surface fitting algorithms may be employed to process the scan data and produce smooth surface digital representation of the subject object. For example, NURBS (non-uniform B-spline) and/or other approaches may be used to achieve such results.

Using the digital representation of the object, a plurality of measurements are extracted therefrom. Where the article to be custom knit is represented by a digital pattern, the measurements that are extracted correspond to locations of pattern elements of the digital pattern. For example, in the case of a garment, pattern elements may correspond to selected widths of a front panel of a shirt at a number of identified locations over the face of the panel. In the case of another article, the pattern elements may similarly correspond to dimensions at selected locations of pattern pieces or, in the case of a 3D knitting machine, dimensions at selected locations of a pattern as a whole. For each of the measurements extracted from the digital representation of the object, a stitch count for a corresponding one of the pattern elements specified by the digital pattern representing the article is automatically produced by scaling the stitch count called for by the pattern according to the extracted measurements and specified wales and courses densities for the material(s) from which the article is to be made, to adjust a shape and fit of the article to a shape and size of the object. The result is a digital pattern representing the article which is customized to the object.

Optionally, a dimensionally-accurate three-dimensional representation of a custom-fit version of the article according to the digital pattern representing the article may be displayed to a user. For example, using a client workstation, the user may view the displayed dimensionally-accurate three-dimensional representation of the article, either by itself or mapped onto a displayed version of the digital representation of the object. This may be done, for example, using a texture mapping approach. In such cases, as style and fit preferences for the article are varied through user interaction with the three-dimensional representation, e.g., using a touch screen, mouse, or other user interface element(s), the digital pattern representing the article which is customized to the object is iteratively updated and the dimensionally-accurate 3D representation of the article varied on-screen accordingly. This interaction and adjustment results in a final digital pattern of the article being produced, e.g., once the user is satisfied with the displayed representation of the article. For example, variations of the style and fit preferences for the article (which can include variation of the specified material from which the article is to be custom-knitted) may be accounted for in the final digital pattern of the article through modifications of the stitch counts for the pattern elements specified by the digital pattern representing the article.

From the final digital pattern of the article, machine instructions representing one or more pattern pieces to be knitted to create the custom-fit version of the article are automatically produced by converting stitch counts of the final digital pattern of the article to knitting sequences for a target computerized knitting machine. The custom-fit version of the article may then be manufactured by the computerized knitting machine according to the machine instructions.

In some cases, the style and fit preferences for the article may involve changes in the materials. For example, a particular article or garment may be specified using a default material which the user may vary according to his or her preferences when interacting with the three-dimensional representation of the article. Variations in material(s) are therefore permitted and are accounted for, e.g., in the final digital pattern of the article, through modifications of the stitch counts for the pattern elements specified by the digital pattern representing the article according to updated wales and courses densities for newly specified material(s).

Similarly, the style and fit preferences for the article may involve changes in the stitches used to fashion the article or portions thereof. For example, a particular article or garment may be specified using a default stitch or stitches. While it is possible for a skilled user to vary these default stitches according to his or her preferences when interacting with the three-dimensional representation of the article, more commonly it will be automated variations of stitch types to accommodate other style and preference selections/modifications made by a user. These stitch type variations require knowledge of the target knitting machine capabilities, hence, the system for producing the custom-fit version of a knitted article is provided a source of target knitting machine information, such as a database, from which the machine capabilities can be determined. Variations in stitch type(s) are therefore permitted and are accounted for, e.g., in the final digital pattern of the article, through modifications of the stitch counts for the pattern elements specified by the digital pattern representing the article according to updated wales and courses densities according to the selected stitch type(s).

Alternatively, or in addition, user interaction with the three-dimensional representation of the article may include customizations of adornment preferences. Accordingly, the method of producing the custom-fit version of the knitted article may further include updating the digital pattern representing the article according to user-specified adornment preferences for the article, e.g., as are varied/specified/recognized through user interaction with the three-dimensional representation to produce the final digital pattern of the article. These adornment preferences may include hardware placement, embroidery selection, and embroidery placement, among other things.

Prior to or as part of the displaying of the dimensionally-accurate three-dimensional representation of the custom-fit version of the article, a motif may be displayed on the digital pattern representing the article. In such cases, the machine instructions representing the pattern pieces will include instructions for yarn colors and stitch type to accommodate the motif. Motifs may encompass any distinctive features or designs, and iteratively updating the digital pattern representing the article may include altering the motif superimposed on the digital pattern representing the article according to the user interaction with the three-dimensional representation. For example, if the motif is a decoration, the placement of the decoration may be varied with respect to the pattern of the underlying article. In one example, the user may be permitted to vary the location of such a decoration over the pattern for the article by moving it with a user interface element such as a mouse (e.g., in a series of click and drag operations) or a touch screen of a display (e.g., using a touch and drag operation). Preferably, the motif is displayed on the dimensionally-accurate three-dimensional representation of the custom-fit version of the article in colors compatible with capabilities of the target computerized knitting machine. As indicated above, these capabilities may be determined by reference to an available database and the color options for display automatically adjusted in accordance with the knitting machine capabilities specified therein.

Another optimization afforded by the present invention is the automatic adaptation (forcing) of stitch counts for corresponding ones of the pattern elements specified by the digital pattern representing the article to odd or even numbers of stitches according to capabilities of the target computerized knitting machine. Some machines require the specifying of odd or even numbers of stitches; hence, the present invention accommodates such requirements through an automated process. For example, where a stitch count to accommodate a user's style and fit preferences would result in a number of stitches that the target knitting machine cannot accommodate, that stitch count may be automatically forced to the closest odd or even number of stitches as required by the target knitting machine while still accommodating the user's size requirements as closely as possible.

Figure 1:
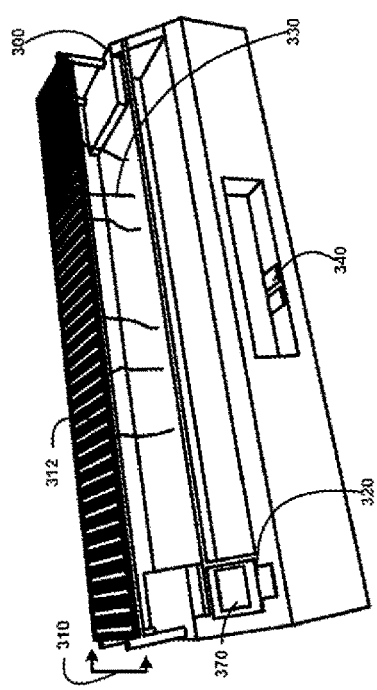
FIG. 1 shows for illustrative purposes an example of an adapted knitting machine according to an embodiment of the present invention.

For convenience, the process for producing a custom-fit version of a knitted article will be described with reference to a garment for an individual, but it should be appreciated that the same process may be used for any article. Referring now to FIG. 1, an example of a knitting machine 300 is shown. Knitting machine 300 includes a creel housing 310, and a series of a plurality of yarn feeders 312 to feed yarn 330 into the knitting machine. The yarn feeder 312 selects the appropriate yarn, based upon default pattern specifications and/or user customizations for yarn quality and color, for example. Two different yarns may be fused together when the knitting machine 300 is switching between the different yarns to enable a more efficient knitting process to avoid stopping the process and maximizing use of the yarn feeders 312 in an embodiment. The knitting machine 300, according to an embodiment, may produce a custom-fit version of a knitted article 340.

The knitting machine 300 further includes an integrated control system 320 including at least one variation adapted knitting machine integrated control systems, at least one order tracking processor 1030, at least one internet communication device 1006, a scanner, and at least one integrated control systems adaptation device to receive order information for processing knitted products. Adaptations can include knitting machines CNC accessories paired with the integrated control system 320.

The integrated control system 320 is coupled with a monitor 370 to display controls to an operator. As a result of a scan of the marking identifier of the knitted product, the operator may view the assembly instructions of a tech pack. If the operator detects a defective panel, the operator may select the knitted product panel on the monitor. The monitor 370 may include a selection area associated with the panel. When the operator selects the selection area, instructions may be sent to the knitting machine to knit an additional panel to replace the defective panel. In this embodiment, substantial time is saved in manufacturing time by just replacing the single defective panel, rather than the entire knitted product.

FIG. 2 illustrates a flow diagram of a knitting process 400 to manufacture the custom-fit version of a knitted article 340, according to an embodiment. The figure illustrates sequential activity blocks, which take place when a user orders a customized knitted product. In order to minimize user-waiting time, the components of the knitting process can be located in a single location, such as a retail store, so that users can obtain the products they order when ready. In this example, the digital representation of the object for which the custom-fit article is to be manufactured is produced by a scanner, however, in other cases the digital representation may be produced using photogrammetry or other means.

In this example, at a point of sale 429, a user 410 has his or her body scanned for preparation of a 2 or 3-dimensional rendition 414 of the user's body. Users may be able to have their body scanned while wearing regular clothing or may wear close-fitting garments so that the scanner can obtain more accurate data if specified by a scanner 412. For a thermal, millimeter wave, and other scanners, garments are substantially transparent and, therefore, garments may be worn by the user as desired.

Examples of whole-body scanners suitable for use by the embodiments include white light scanners, structured white light scanners, eye-safe laser scanners, millimeter wave imaging scanners, thermal or heat body scanners, a camera, or a video camera. Whole-body scanners are known in the art and are available from manufacturers such as Cyberware, Inc., Monterey, Calif. (model WBX white light scanner); Breukmann GmbH, Meersburg, Germany (model body-SCAN structured while light scanner); Vitronic Machine Vision Ltd., Louisville, Ky. (model Vitus 3D Bodyscanner XXL, eye-safe laser scanner); Unique Solutions, Dartmouth, Nova Scotia, Canada (model Intellifit millimeter wave RF scanner); and Fluke Corporation (thermal scanner).

Specialized software converts the body scan to a 2- or 3-dimensional body scan rendition 414. Examples of software programs that may be used include Bodymetrics (San Francisco, Calif.), CREAFORM (Ametek), and Naked Labs, Inc. (Redwood City, Calif.). A selected knitted product from the display is scaled to the user's body shape, as described in embodiments herein. Examples of software programs and manufacturers, which provide for realistic draping and fit visualization of knitted products include Optitex 3D Virtual Prototyping by Optitex (New York, N.Y.); Vstitcher by Browzwear Solutions Pte. Ltd. (Singapore); and Deviron LLC (Ithaca, N.Y.). The selected knitted product may be further customized as described herein.

Once the body scan is complete, the user's profile 415 may be created or amended and the result saved/applied to the user's digital self 422. The profile may include any search or order history, registration information, and any other user preferences gathered from any source. The three-dimensional digital self can be stored for later retrieval so that user can make subsequent purchases without having to have his/her body re-scanned.

As noted above, depending on the kind of scanner employed, the scan may produce a 3D point cloud data set representing the user, and that data set can be processed to produce a polygonal mesh representing the user's body, i.e., a digital representation of the user. In other cases, image data may be converted to the digital representation of the user. For some applications, the digital representation produced by the scan alone will be sufficiently accurate for producing a custom-fit version of the knitted article. In other applications, however, the scan data may not provide sufficient dimensional accuracy and so surface fitting algorithms may be employed to process the scan data and produce a smooth surface digital representation of the subject user.

The digital representation of the user is also used to extract measurements that are incorporated in the user's digital self 422. Several commercial tools exist for extracting such measurements from scan data. For example, Poly-Works by InnovMETRIC Software Inc. is a software tool for automatically extracting measurements from polygonal surfaces (such as the polygonal mesh representing the user's body). Also, tools for flattening 3D shapes to 2D patterns, e.g., for purposes of making measurements, such as Multi-Surf available from AeroHydro are available and may be applied in order to extract the needed measurements from the user's digital representation. Examples of measurement extraction from digital scan data are discussed in U.S. Pat. No. 6,968,075 to Chang, incorporated herein by reference.

The measurements to be extracted from the digital representation of the user are those corresponding to locations of pattern elements of a digital pattern for the garment to be knitted. Hence, while some measurements may exist within the user's digital self, e.g., from previous garment manufacturing processes, garment selection 416 may require that new or additional measurements be extracted in order to accommodate the new garment design.

The user may select a garment style and/or design at the style or design selection block 416, as described with reference to an Internet page in detail herein. The styles for selection can be shown as rotating three-dimensional holographic projections or models on a display, e.g., superimposed or texture mapped on the body scan of the user, or simply as images of finished garments.

The style and/or design as represented in a digital pattern may be received from designer community 420 comprising fashion designers 413, both amateur and professional. The fashion designers 413 may submit their designs 421 to the knitting application 530, as described herein. The knitting application 530 includes an integrated knitted textiles variation ecommerce web application 1102. The patterns typically have pattern elements corresponding to sizing at predetermined locations.

Once the style is selected, the user may further select custom features 417 for the knitted product. For example, the user may be given the option to select colors, size of the knitted product, fit type of the knitted product, size or dimension of at least one feature of the knitted product, a color of the at least one feature, a design on the at least one feature, a yarn quality of the at least one feature, a yarn type of the at least one feature, a stitch type for the yarn for the at least one feature, a yarn weight for the at least one feature; and a wash type of the yarn for the at least one feature. Further, any finishing features may be selected, such as buttons, pockets, rivets, clips, Velcro, or zippers.

The style and design selections can be used for visualization of fabric draping and fit along the contours of the digital representation of the user bod. In this manner, users can see an image of their own body wearing the desired design, and can adjust fabric draping, fit, and other features as desired. As adjustments/customizations are made, the sizing parameters demanded by the pattern elements of the selected design are applied. For example, in the case of a garment, pattern elements may correspond to selected widths of a front panel of a shirt at a number of identified locations over the face of the panel. In the case of another article, the pattern elements may similarly correspond to dimensions at selected locations of pattern pieces or, in the case of a 3D knitting machine, dimensions at selected locations of a pattern as a whole. For each of the measurements extracted from the digital representation of the object, a stitch count for a corresponding one of the pattern elements specified by the digital pattern representing the article is automatically produced by scaling the stitch count called for by the pattern according to the extracted measurements and specified wales and courses densities for the material(s) from which the article is to be made, to adjust a shape and fit of the garment to the user's digital representation and customizations. The result is a digital pattern representing the garment which is customized to the user.

Certain designers may wish to maintain a certain style by limiting the customization options available to users. In certain embodiments, a computer program allows the user to add, delete, amend, or scale customized features on their scanned rendition. A knitted product design tool may be used by fashion designers and/or the users to create the styles or designs, if desired. The design tool may include, for example, Click & Sew by Wild Ginger; Dress Shop Pro and My Pattern Designer by Livingsoft; Garment Designer by Cochenille; and Pattern Design Software by Optitex. The designs may be uploaded to the knitting application 530. A user or a fashion designer can be paid for a user selecting their style and/or design. In one embodiment, the barrier-to-entry for new designers to contribute designs to the designer community is substantially eliminated.

The customized knitted product on the display may then be converted into a file readable by the knitting machine at a convert block 418. The file may comprise a tech pack including a plurality of specifications for the knitted product. The plurality of specifications including some or all of: dimensions of each panel of the knitted product; at least one yarn color of each panel; at least one design on each panel; at least one yarn quality of each panel; at least one yarn type used for each panel; at least one stitch type for the yarn in each panel; thread color; at least one stitch tension or width in each panel; at least one view of the finished knitted product; assembly instructions for the knitted product; any finishing features or details such as labels; and at least one wash type of each panel. As part of this process, stitch counts for corresponding ones of the pattern elements specified by the digital pattern representing the garment may be automatically adapted (forced) to odd or even numbers of stitches according to capabilities of the target computerized knitting machine. For example, where a stitch count to accommodate a user's style and fit preferences would result in a number of stitches that the target knitting machine cannot accommodate, that stitch count may be automatically forced to the closest odd or even number of stitches as required by the target knitting machine while still accommodating the user's customization requirements as closely as possible.

The convert block 418 may divide the knitted product into several knitted panels to be knitted individually. The knitted panels may be knitted at block 423, which could be at a point of sale 429 or elsewhere.

The knitted panels may be sewn together as indicated in the tech pack at block 426 and finished at block 427. Alternatively, in the case of a 3D knitting machine, the garment may be knitted as a whole without requiring sewing. At the finishing block 427, quality control including dimensional and color confirmation may be executed. Finishing may also include belt looping or elastic insertion; snaps or zipper creation; buttonhole creation and button sewing equipment; label placement and type; rivets; and embroidery. The finishing equipment may be any kind of equipment used after manufacture to provide the garment in a ready-to-wear condition to the user. For example, the finishing equipment can improve the look, performance, or feel of the completed garment, and may comprise washing, drying, and pressing equipment, such as a washer (conventional or stone washer), a dryer, and/or an iron. The finishing equipment can also comprise a garment wear station or stretching station. The finished knitted product may then be presented or shipped to the user 410.

Figures 3, 4:
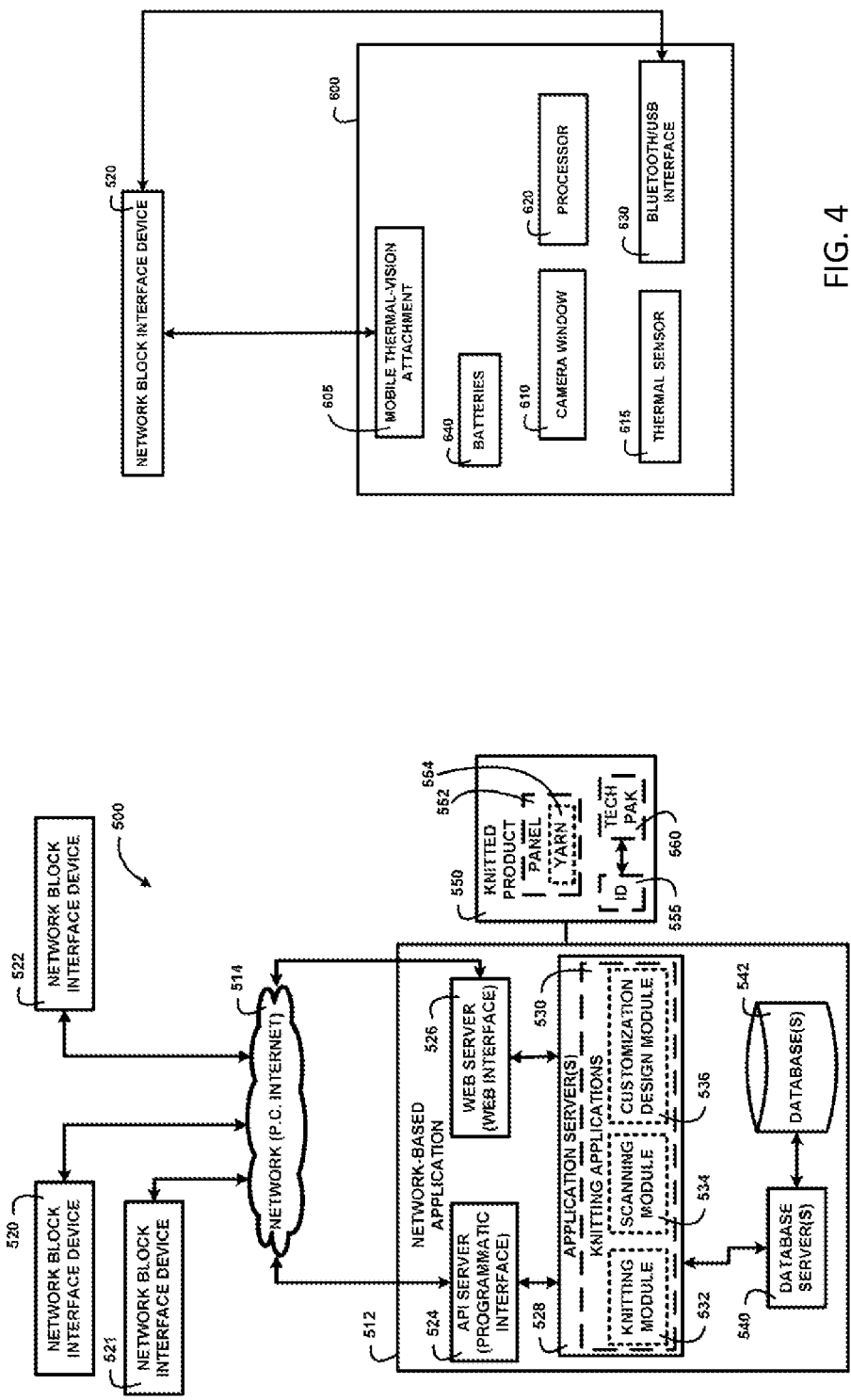
FIG. 3 illustrates a network diagram depicting a system having a client-server architecture, according to an example embodiment of the present invention.
FIG. 4 illustrates a thermal scanner according to an example embodiment of the present invention.

FIG. 3 illustrates a network diagram depicting a system 500 having a client-server architecture, according to an example embodiment. A system, in the example form of a network-based system 512, provides server-side functionality, via a network 514 (e.g., the Internet, a public or private telephone network (wireline or wireless), a private wireless network using technologies such as Bluetooth or IEEE 802.11x or other networks) to one or more network interface devices 520, 521, 522. In a client-server architecture, FIG. 3 illustrates, for example, a network interface device being an Internet client (e.g., a browser, such as the INTERNET EXPLORER® browser developed by MICROSOFT®) executing on client machine, e.g. on a network-based device. A device application or a programmatic client may also execute on the client machine. Embodiments are of course not limited to a client-server architecture, and could equally well find applications in a distributed, or peer-to-peer, architecture system.

The network interface devices, including network-based device(s) 520, 521, 522, may include a mobile device, a palmtop computer, a laptop computer, a desktop computer, a personal assistant device, a cellular telephone, a communications device, a wireless telephone, a tablet, a land-line telephone, a control system, a camera, a scanner, a television, television cable, a telephone with an Internet browser, a facsimile machine, a printer, a pager, and/or a personal trusted device. The device 520, 521, 522 may include a card, such as a smart card, a magnetic card, and/or a key card. The device may include a telephone or any device capable of Short Messaging Service (SMS) messaging, multimedia messaging service (MMS) messaging and/or generating audio tones, such as dual-tone multi-frequency (DTMF) tones. The device may be browser-enabled. The device may engage in an interactive message and/or open communication session, such as SMS, electronic mail, xHTML, Wireless Application Protocol (WAP), Internet, interactive voice response (IVR) and/or other mobile interfaces. The communication session between a client machine and the network-based system may involve multiple technology modalities, e.g. the client user may engage the system via SMS and receive a responsive communication as an SMS with an embedded hyperlinked URL directing the client user's device to a WAP or Internet page. A hyperlinked URL may be delivered directly to the device from the application server(s) 528 and may be used to access an Internet site or a microbrowser, such as a WAP site. The device 520, 521, 522 may enable mobile videophone communications, television signals, and/or radio signals. The device may include a receiver or transmitter to receive or to transmit near field communications.

At least one of the devices 520, 521 or 522 may be associated with an account holder. Turning specifically to the network-based system 512, an Application Program Interface (API) server 524, and an Internet server 526 may be coupled to, and may provide programmatic interfaces to one or more application servers 528. The devices may use one or more of these interfaces to access the application server(s) 528. For example, the Internet client may access the application server(s) 528 via the Internet interface supported by the Internet server 526. The Internet interface may include an Internet browser or any microbrowser, such as xHTML or WAP. Similarly, the programmatic client accesses the various services and functions provided by the application server(s) 528, via the programmatic interface provided by the API server 524 and/or the Internet server 526. In an additional embodiment, an application supported by one or more applications of the application server(s) may be downloadable to the network-based device. The device(s) may host the interface associated with the one or more applications of the application server(s) 528. The interface on the device may be an API interface, an SMS interface, an Internet interface, and/or an IVR interface. Consumer wireless device platforms, such as Java 2 Platform Micro Edition (J2ME), J2SE and J2EE allow developers to use Java and a wireless toolkit to create applications and programs for the device 522. The J2ME interface may include an application-programming interface (API) for the device. The application of the programmatic client may also access the Internet using, for example, Binary Runtime Environment for Wireless (BREW).

The design files, which are used to manufacture clothing, can employ any kind of file format, which is used in the fashion industry. For example, the design files can be stored in a proprietary format, DXF format, XML format, or another format.

The network 514 may include a mobile telephone network, a wireless wide area network (WWAN), a wireline telephone network, a wireless local area network (wireless LAN or WLAN), a wireless Metropolitan Area Network (MAN), and/or a wireless personal area network (PAN) (e.g., a Bluetooth® network). Other network-based technologies that may be used to connect include PON, VSAT satellite or Global Positioning Satellite (GPS), Micro-impulse Radar, near-filed communication, Radio Frequency identification (RFID), UltraWide Band, and/or Infrared. The network-based device may connect to the Internet using mobile Internet exchange, e.g. Wireless Application Protocol (WAP) and/or Hypertext Transport Protocol (HTTP).

The application server(s) 528 may host one or more knitting applications(s) 530. The knitting applications 530 may include a knitting management module (or knitting module) 532, a scanning module 534 and a design module 536. The application server(s) and modules 532, 534, and 536 may have access to a database 542 through, for example, the database server(s) 540. The database may include user account information, such as the user profile and user selections, the styles and designs, and the tech pack information.

In an embodiment, the knitting module 532 may convert the customization selections to the tech pack 560 described herein. The knitting module 532 may instruct the knitting machine 300 to knit the customized knitted product 550. The knitting module 532 may comprise one of the software products described herein.

In an embodiment, the scanning module 534 converts the scan from the scanner 412 to the scanned rendition 414. The scanning module 534 may comprise one of the software products described herein. As explained above, in some instances scan data produced by a 3D or 2D scanner may be augmented or enhanced using surface fitting algorithms to process the scan data and produce smooth surface digital representations of the subject object for which the custom-fit article is to be knitted. Those algorithmic approaches may be implemented by scanning module 534.

In an embodiment, the design module 536 enables the user and/or a fashion designer to create knitted product designs and styles, and to customize those knitted products, as described herein. The design module 536 may comprise one of the software products described herein.

The knitted product 550 may include knitted panels 552 formed of yarn 554. The knitted panels may include a front panel, a back panel, and side panels to be fused together, e.g., sewn together per instructions in the tech pack 560. In other cases, where a 3D printer is used, the entire article may be specified as a whole.

The knitted product may further comprise marking identifiers 555 for the knitted product and/or the knitted panels, indicating information regarding the knitted product. The marking identifiers 555 may indicate where in the process the knitted product is, e.g., shipping, knitting, received, etc., as a tracking device. The marking identifiers 555 may be sensed by a sensor in the process and may refer the operator to the tech pack 560, as described in more detail herein. The marking identifiers may include a yarn type, such as a metallic or magnetic yarn knitted into the panel. The marking identifiers may additionally or alternatively include a particular stitch, or a particular design in the panel. The marking identifiers may include any device coupled with the knitted product or panel, such as a plastic device. The device may be able to be sensed by any type of suitable sensor, such as radio frequency sensor, magnetic sensor, color sensors, etc.

The knitted product may include denim, twill, corduroy, flannel, printed designs, integral designs with different yarn colors or quality or type, fleece, terry, and mesh, in embodiments. The knitted product 550 may include a garment, upholstery, or fabric in an embodiment. The garment can be a pair of jeans, a pair of pants, shirt, blouse, vest, suit, dress, skirt, undergarment, hat, purse or bag, and shoes. Upholstery may include blankets or artwork. Artwork may include images on a substrate that is transferable to an exterior of a vehicle.

In embodiments, the yarn 554 may have different yarn types, different yarn quality, and different yarn colors available. In embodiments, the yarn 554 may comprise any suitable materials, such as cotton, silk, cashmere, and even metals, wood, and plastics. The yarn 554 may be any material suitable for use in a knitting machine with sufficient flexibility to stitch, and sufficient structural integrity to maintain its intended shape. The yarn may be pre-colored or dyed on-demand.

FIG. 4 illustrates a thermal scanner 600 according to an example embodiment. The thermal scanner 600 may include a mobile thermal vision attachment 605 to couple the thermal scanner 600 to the network-based device 520. The thermal scanner 600 may further have a camera window 610 to point at a heat signature of an entity, such as a human user. The thermal scanner 600 may further have a thermal sensor 615 to pick up the heat signature of the entity. The thermal scanner 600 may further have a processor 620 to execute instructions related to scanning the entity. The thermal scanner 600 may further have an interface 630, such as Bluetooth® or a USB port to allow the thermal scanner 600 to communicate with a computing device described herein. The thermal scanner 600 may further have batteries 640 or an alternative power source or an interface to power from the device 520 or the computing device.

Alternatives to a thermal scanner are contemplated herein. For instance, the user may manually enter their measurements into the scanning module, or one of the scanners named herein may be used to provide a rendition of the user.

Figures 5, 12A:
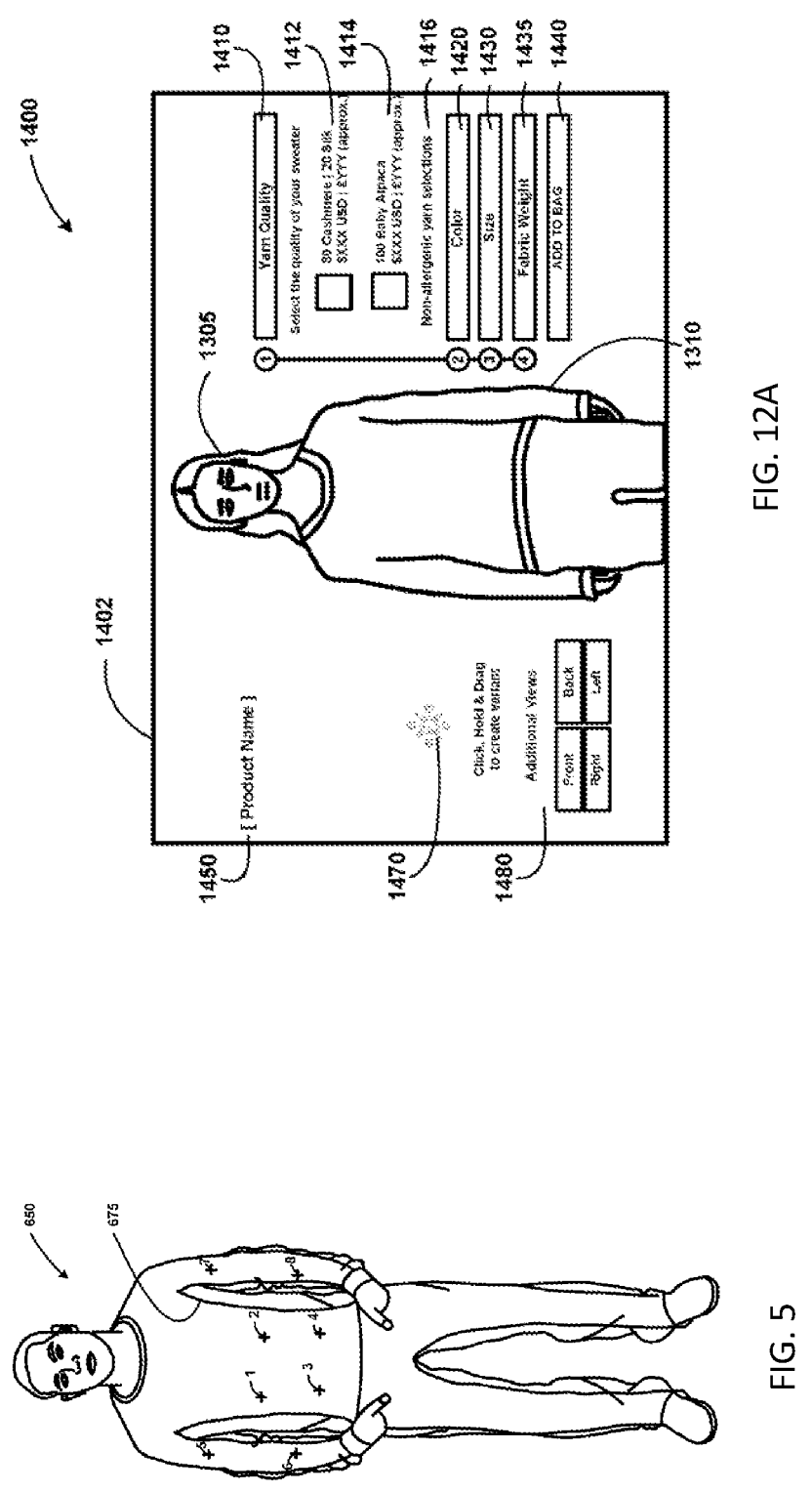

FIG. 5 illustrates an entity 650 scanned by a scanner according to an example embodiment. The entity 650 may turn around for the scanner to take multiple pictures of the entity to procure a 3-D rendition of the entity (or various 2-D renditions), or the scanner may have video capabilities. The entity 650 in this illustration includes a man with loose-fitting apparel. An outline 675 of the man is scanned from various perspectives by the scanner. In this embodiment, the man has on the loose-fitting apparel. The loose-fitting apparel is substantially transparent to some scanners, hence, in this embodiment, the man does not have to remove any clothing or put on any apparatus to get an accurate outline 675 of his body from each perspective. Thus, a more accurate outline 675 of the man will be processed and displayed as an avatar of the man for use with embodiments described herein.

Figure 6B:
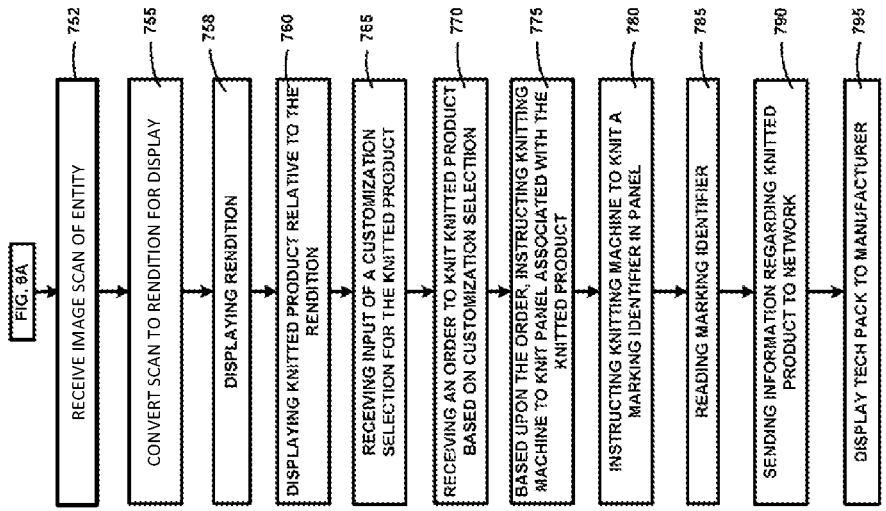
FIGS. 6A and 6B illustrate a flow diagram of a knitting process including the entity scan details, according to an embodiment of the present invention.
Figure 6A:
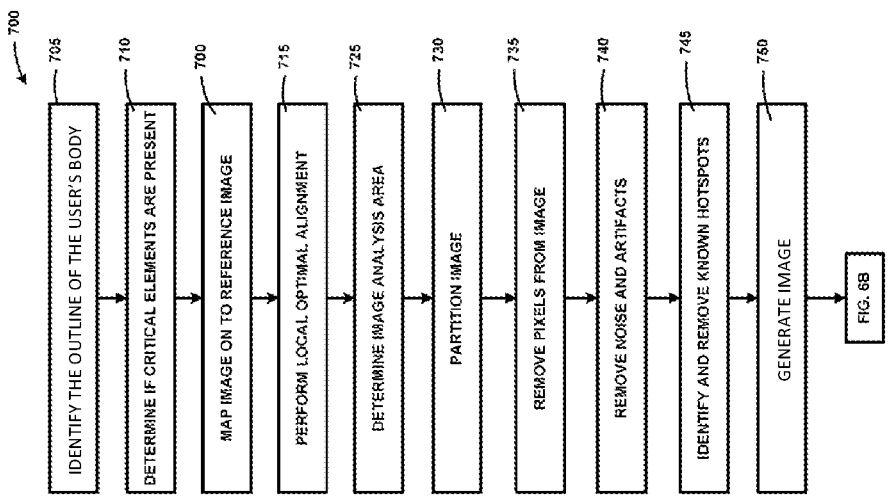

FIGS. 6A and 6B illustrate a flow diagram of a knitting process 700 including the entity scan details, according to an embodiment. The knitting process includes the scanning module identifying an outline of the user at block 705 using one of the scanning methods described herein. The scanning module may then optionally determine if critical expected elements are present in the entity scan image at block 710. The scanning module may then optionally map the image to a reference image at block 715. The scanning module may then optionally perform optimal alignment to align or orient the reference image at block 720 for the customization design module. The scanning module may then optionally determine an image analysis area of the entity at block 725. The scanning module may then optionally partition the reference image of the entity at block 730. The scanning module may then optionally remove any pixels from the reference image of the entity at block 735. The scanning module may then optionally remove any noise or artifacts from the reference image of the entity at block 740. The scanning module may then optionally identify and remove known hotspots, if any, from the reference image at block 745. The scanning module may then generate the image of the entity at block 750.

Continuing the process at FIG. 6B, the scanning module may then send the image of the entity to a receiving computing device at block 752. The computing device may augment the scan data using surface fitting algorithms (if needed) and convert the scan (as augmented) to a rendition for a display at block 755. The computing device may display the rendition at block 758. The computing device may further display a knitted product relative to the rendition at block 760. The computing device may receive input of a customization selection from the customization module for the knitted product at block 765. The computing device may receive an order, from the user, to knit the knitted product based on the customization selection at block 770. The computing device may, based upon the order, instruct the knitting machine to knit at least one panel associated with the knitted product at block 775. The computing device may instruct the knitting machine to knit a marking identifier in the knitted panel at block 780. A sensor associated with the computing device may read the marking identifier at block 785. The sensor may be a photo sensor, a magnetic sensor, a UV sensor, or any suitable sensor to read the marking identifier. The computing device may send information regarding the knitted product, received from the marking identifier, to the network for tracking the knitted product and/or quality control at block 790. The monitor may display tech pack information to the operator or manufacturer of the knitted product for the quality control, for instance, at block 795.

Figure 7:
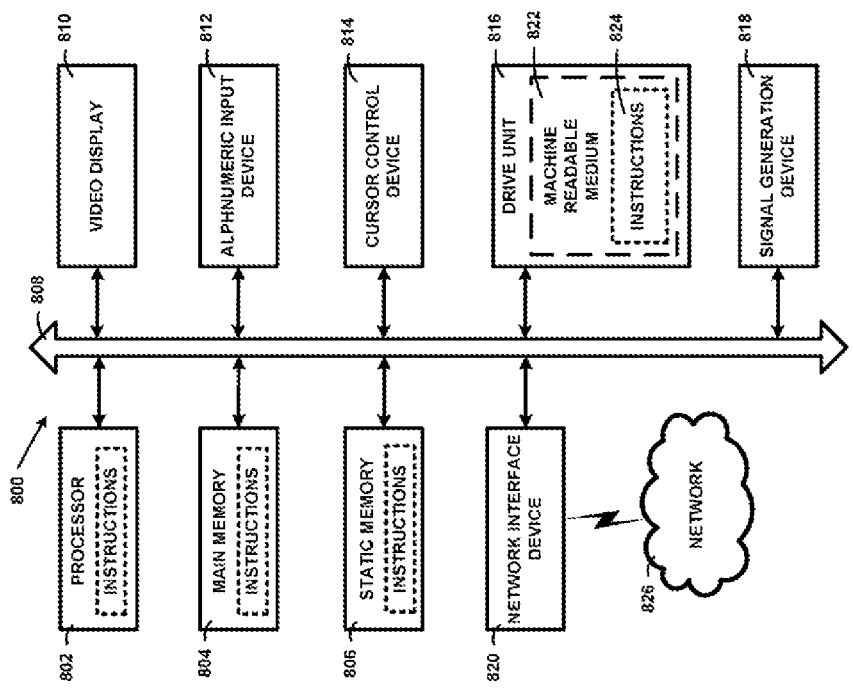
FIG. 7 illustrates a diagrammatic rendition of a machine in the example form of a computer system according to an embodiment of the present invention.

FIG. 7 shows a diagrammatic rendition of a machine in the example form of a computer system 800 within which a set of instructions, for causing the machine to perform any one or more of the methodologies discussed herein, may be executed. In alternative embodiments, the machine operates as a standalone device or may be connected (e.g., network) to other machines. In a network deployment, the machine may operate in the capacity of a server or a client user machine in server-client user network environment, or as a peer machine in a peer-to-peer (or distributed) network environment. The machine may be a server computer, a client user computer, a personal computer (PC), a tablet PC, a set-top box (STB), a Personal Assistant (PDA), a cellular telephone, a mobile device, a palmtop computer, a laptop computer, a desktop computer, a personal assistant, a communications device, a wireless telephone, a land-line telephone, a control system, a camera, a scanner, a facsimile machine, a printer, a television, television cable a pager, a personal trusted device, an Internet appliance, a network router, switch or bridge, or any machine capable of executing a set of instructions (sequential or otherwise) that specify actions to be taken by that machine.

Further, while a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (e.g., a central processing unit (CPU), a graphics processing unit (GPU), or both), a main memory 804 and a static memory 806, which communicate with each other via a bus 808. The computer system 800 may further include a video display unit 810 (e.g., a liquid crystal display (LCD) or a cathode ray tube (CRT)). The computer system 800 also includes an input device 812 (e.g., a keyboard), a cursor control device 814 (e.g., a mouse), a disk drive unit 816, a signal generation device 818 (e.g., a speaker) and a network interface device 820.

The disk drive unit 816 includes a machine-readable medium 822 on which is stored one or more sets of instructions (e.g., software 824) embodying any one or more of the methodologies or functions described herein. The instructions 824 may also reside, completely or at least partially, within the main memory 804, the static memory 806, and/or within the processor 802 during execution thereof by the computer system 800. The main memory 804 and the processor 802 also may constitute machine-readable media.

The instructions 824 may further be transmitted or received over a network 826 via the network interface device 820.

Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein below. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry, (e.g., as encompassed within a general-purpose processor or other programmable processor) which is temporarily configured by software to perform certain operations. It may be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein.

While the machine-readable medium 822 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, or optical and magnetic media.

As noted, the software may be transmitted over a network using a transmission medium. The term "transmission medium" shall be taken to include any medium that is capable of storing, encoding or carrying instructions for transmission to and execution by the machine, and includes digital or analog communications signal or other intangible medium to facilitate transmission and communication of such software.

EXAMPLE EMBODIMENTS

Figure 8:
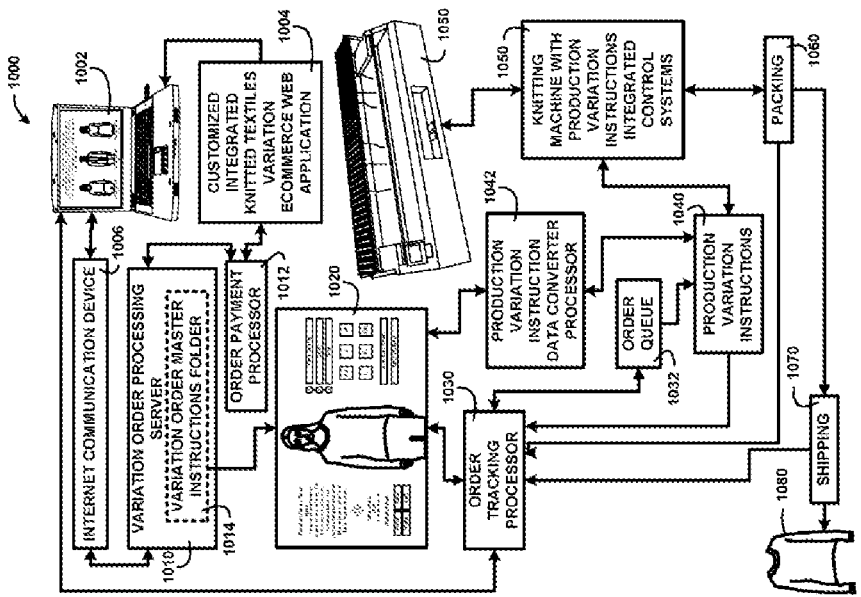
FIG. 8 shows a block diagram of an overview of a process for manufacturing a custom knitted product according to an embodiment of the present invention.

FIG. 8 shows a block diagram of an overview of a process for manufacturing a custom knitted product according to an embodiment. FIG. 8 shows a knitted textile consumer Internet device logged into customization Internet site 1000 using a knitted products customization ecommerce Internet application 1004. The knitted products customization ecommerce Internet application 1004 communicates with an order-processing server 1010 using an Internet communication device 1006. The consumer logs into the order-processing server 1010. The order processing server 1010 processes the consumer queries on the customization Internet site to select an apparel style and customizations to individualize the garment to suit the consumer's desired changes for an order. A consumer order selection 1020 is made and transmitted to the order-processing server 1010. The price of the order with customizations is calculated, transmitted to and displayed on the consumer Internet device. The consumer inputs payment data. The order-processing server 1010 processes the payment using an order payment processor 1012. Upon a successful payment the consumer order is recorded using an order tracking processor 1030 and processed into an order queue 1032 according to an embodiment.

The order-processing server 1010 processes the consumer style and customizations, converting the data into production customization instructions 1040. The converted data is transmitted to a knitting machine with production customization instructions integrated control system 1050 when the consumer order queue production position is reached. The consumer garment is knitted on the knitting machine with production customization instructions integrated control system 1050 incorporating the consumer-selected customizations according to an embodiment.

Upon garment completion, the order tracking processor 1030 transmits garment packing 1060 instructions and the garment is packed for shipping. When the packing 1060 is completed the order tracking processor 1030 transmits garment shipping 1070 instructions including the consumer inputted shipping address data. The order tracking processor 1030 records the shipping 1070 tracking code in the order-processing server 1010. A consumer ordered garment is delivered to consumer 1080. During the order processing the consumer can log into the customized knitted products customization ecommerce Internet application 1004 and follow the progress of their order according to an embodiment.

Figure 9B:
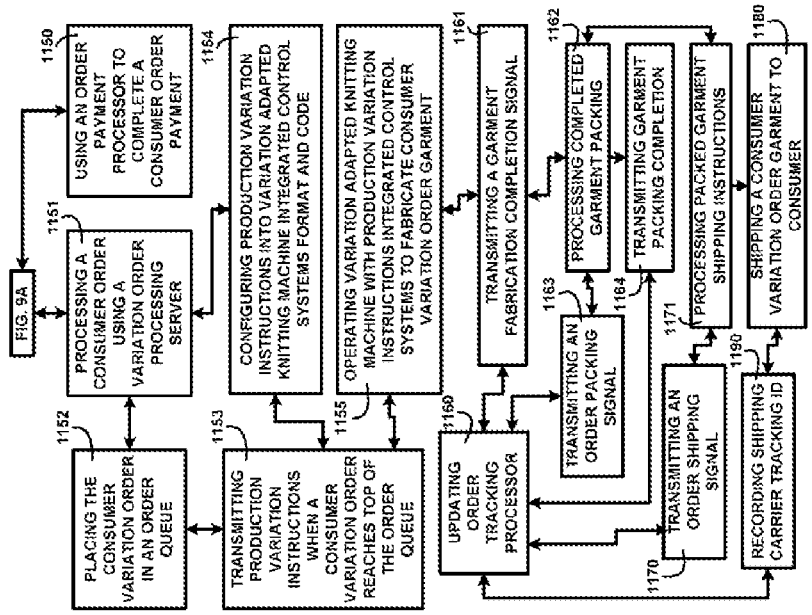
FIGS. 9A and 9B show a block diagram of an overview flow chart of a process for manufacturing a custom knitted product according to an embodiment of the present invention.
Figure 9A:
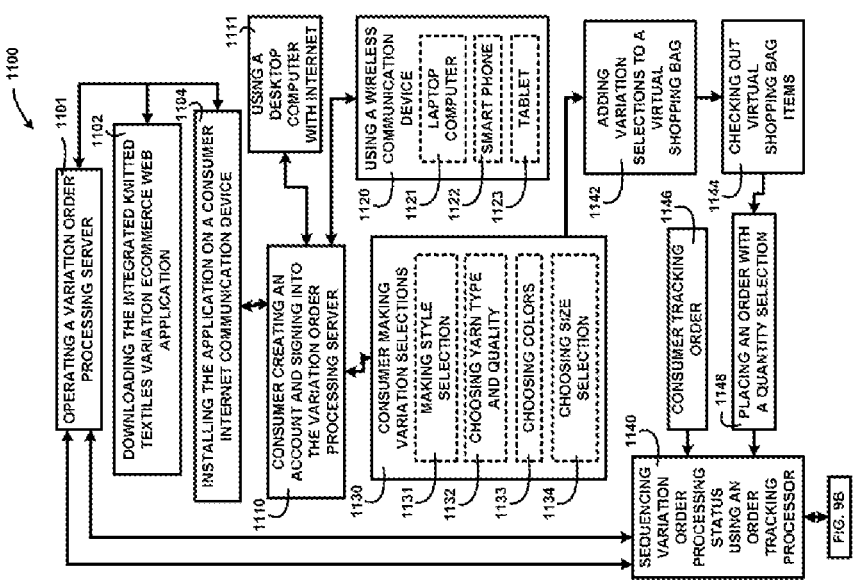

FIG. 9A shows a block diagram of an overview flow chart of a process for manufacturing a custom knitted product according to an embodiment. FIG. 9A shows operating an order-processing server 1100. The order processing server 1100 processes downloading the integrated knitted textiles variation ecommerce web application 1102 and installing the application on a consumer Internet device communication device 1104. A consumer creating an account and signing into the order-processing server 1110 can be using a desktop computer with Internet 1111.

A consumer creating an account and signing into the order processing server 1110 can be using a wireless communication device 1120 including laptop computer 1121, smart phone 1122, and tablet 1123. A consumer making customizations 1130 can be making style selection 1131, choosing yarn type and quality 1132, choosing colors 1133 and choosing size selection 1134.

Upon completing selections, the consumer can proceed to adding customizations to a virtual shopping bag 1142. During checking out virtual shopping bag items 1144 the consumer can continue by placing an order with a quantity selection 1148. The consumer order is tracked with sequencing order processing status using an order tracking processor 1140. The order tracking processor records consumer order tracking 1146 throughout the fabrication processing steps according to an embodiment. The process flow chart description continues on FIG. 9B.

FIG. 9B shows a block diagram of an overview flow chart of a process for manufacturing a custom knitted product order processing to complete a consumer order payment 1150. Successful completion of the consumer order payment triggers processing a consumer order using an order-processing server 1151. The order-processing server 1151 may be used for placing the consumer order in an order queue 1152.

The order-processing server 1151 may be used for configuring production customization instructions into customization adapted knitting machine integrated control system format and code 1154. The order-processing server may be used for transmitting production customization instructions when a consumer order reaches top of the order queue 1153. Operating customization adapted knitting machine with production customization instructions integrated control system to fabricate consumer order garment 1155.

Continuous tracking of a consumer order is updated by transmitting a garment fabrication completion signal 1161 for updating the order tracking processor 1160. The order tracking processor 1160 may continue the processing by transmitting order-packing signal 1163. The order-packing signal can be configured to include a determination of the packing materials including a packing box size. The packing materials determined are paired with the completed garment for processing completed garments packing 1162. Transmitting garment-packing completion 1164 is sent for updating order tracking processor 1160 tracking status.

The order tracking processor 1160 continues the processing by transmitting an order-shipping signal 1170 including processing packed garment shipping instructions 1171. Processing packed garment-shipping instructions 1171 can be configured to include automatically printing of shipping documents. A package carrier upon completion of shipping preparation processing arranges picking up the packed finished garment for shipping a consumer order garment to consumer 1180. Recording shipping carrier tracking ID 1190 data takes place when updating order-tracking processor 1160. The consumer can sign in with the knitted products customization ecommerce Internet application to get current order tracking status including the shipping tracking data according to an embodiment.

Figure 10B:
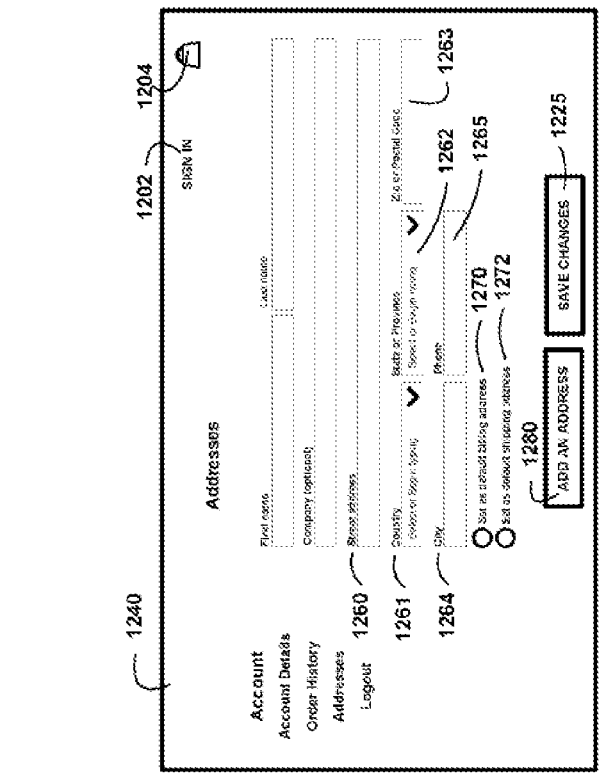
FIGS. 10A through 10B show a block diagram of an overview flow chart of an Internet application to sign up to order a customized knitted product according to an embodiment of the present invention.
Figure 10A:
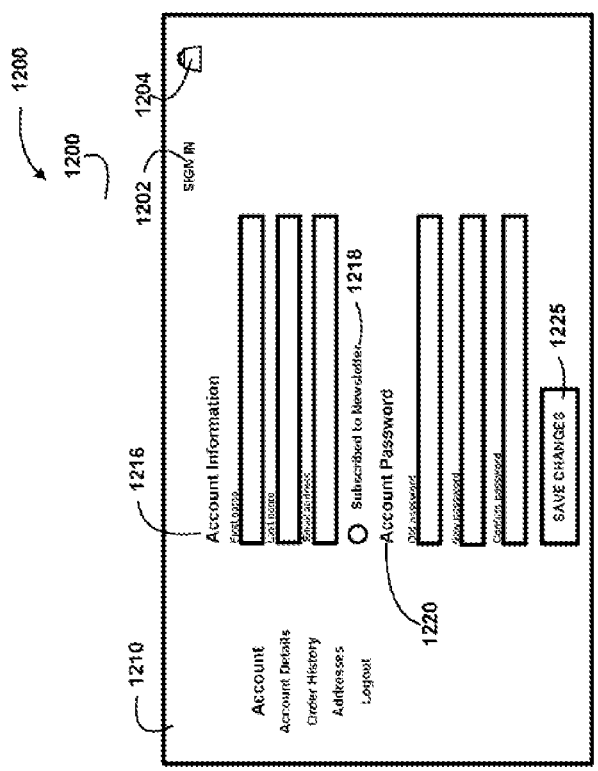

FIG. 10A shows a block diagram of an overview flow chart of Internet application consumer account page according to an embodiment. FIG. 10A shows a consumer creating an account 1200 using a knitted products customization ecommerce Internet application consumer account page 1210. The knitted products customization ecommerce Internet application consumer account page 1210 gives the consumer an option to sign in 1202 if they already have an account. A shopping bag icon 1204 is for use in placing a knitted products order. The consumer inputs account information 1216 including for example first name, last name and email address.

The consumer can indicate whether they are subscribed to newsletter 1218. The consumer can enter an account password 1220. The consumer may change their account password 1220 by entering an old password, new password, confirm password and then save changes 1225. The knitted products customization ecommerce Internet application consumer account page 1210 can be used to check an account, account details, order history, addresses and logout according to an embodiment.

FIG. 10B shows a block diagram of an overview flow chart of Internet application consumer addresses page according to an embodiment. FIG. 10B shows an Internet application consumer addresses page 1240 with the sign in 1202 and shopping bag icon 1204. The Internet application consumer addresses page 1240 is automatically populated with a first name and last name of the account data from the order-processing server. The consumer may input a street address 1260, country 1261, state or province 1262, zip or postal code 1263, city 1264, and phone 1265. The consumer may select the address data entered to set as default billing address 1270 and set as default shipping address 1272. The consumer may add an address 1280 for example a different shipping address and then save changes 1225 according to an embodiment.

FIG. 11A shows a block diagram of an overview flow chart of a style selection page 1300 according to an embodiment. The style selection page 1300 includes instructions for the consumer to select a desired style. Next, the user may click and drag any suitable feature, such as sleeve length or a button, relative to the selection. The user may place the order and receive the personal design in a couple of days as shown at page 1302. FIG. 11A shows for example apparel style #100 1310 with an identifying product name #100 1312 and number. Other styles are displayed including, for example, apparel style #200 1320 with product name #200 1322, and apparel style #300 1330 with product name #300 1332 for a selection by the consumer garment style selection according to an embodiment.

FIG. 11B illustrates an example of a feature of the knitted product selection that may be customized. The selected knitted product may include default features, such as colors, length, fit, stitch type, yarn type, and other features as described herein. In this embodiment, the sleeve length customization option page 1340 is shown. In this example the sleeve length customization selection page 1340 displays apparel style #100, a long sleeve 1310, on a model, such as a user rendition 1305 with selection box 1342. Sleeve length customization selection page 1340 shows apparel style #101 with a ¾ sleeve 1350 with selection box 1354, or a style #102 short sleeve 1360 with selection box 1364. Any other sleeve customization may be selected by the user including, for example, a sleeveless customization, not shown, according to an embodiment.

FIG. 12A illustrates an example of the customization selection page 1400 for style 1310, according to an embodiment. The customization selection page 1400 may include default values from the designer and the scanned rendition of the user in the customization features. Some or all of these default values may be changed by the user as desired. For example, there may be a default yarn quality 1410, a default color 1420, a default size 1430, and a default fabric weight 1435. There may be other default selections of features that may be customized that are not shown in this figure, such as finishing features or details, such as a design or embroidery.

FIG. 12A illustrates customized selections available for yarn quality 1410 for the apparel style #100 1310 selected by the consumer. The consumer may be presented with the designer default option and/or alternative choices to select. In this embodiment, the quality of the yarn may be selected including, for example, 80% cashmere|20% silk (with price) at button 1412, including a selection box. The designer may limit the selections available if desired. Another selection choice may include 100% baby alpaca (with price) at button 1414, including a selection box. The yarn quality customization selection may include non-allergenic yarn selections 1416, selections not shown, for those consumers who have fabric material allergies to wool, for example, according to an embodiment. After the consumer chooses the selection or feature for the knitted product, in one embodiment, the selection may be reflected in the knitted product on the avatar body 1305.

FIG. 12A shows other selection sections that include color 1420, size 1430, and fabric weight 1435. A selection to add to bag 1440 is used for ordering a consumer garment with customizations. Also shown on the page 1402 is the product name 1450 and a style description 1460:

a. "Long sleeve wool sweater striped in black and navy. Rib knit crewneck collar, cuffs, and hem in black. Knit jacquard design in dark tones. Diagonal seam at front and back. Asymmetric hem."

The user may select icon 1470 to click on a customizable detail, design, panel, or feature to drag the feature, design, panel or detail over or onto the knitted product, as desired. The icon 1470 may also be used for scaling the customization, according to user desire. After the consumer chooses the selection or feature for the knitted product, in one embodiment, the selection may be reflected in the knitted product on the avatar body 1305.

Viewing icons 1480 are available for the user to see all views of the knitted product, as customized, including a 360 degree view. The user may to create additional views including front, back, right and left, according to an embodiment.

Figure 12C:
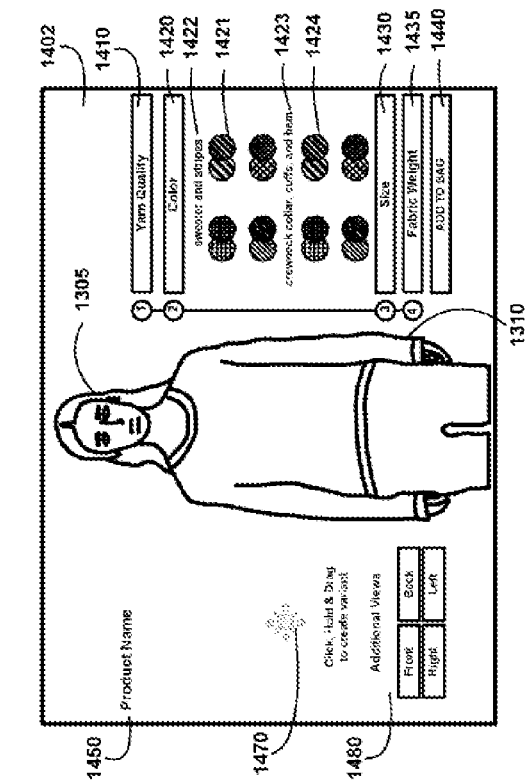
Figure 12B:
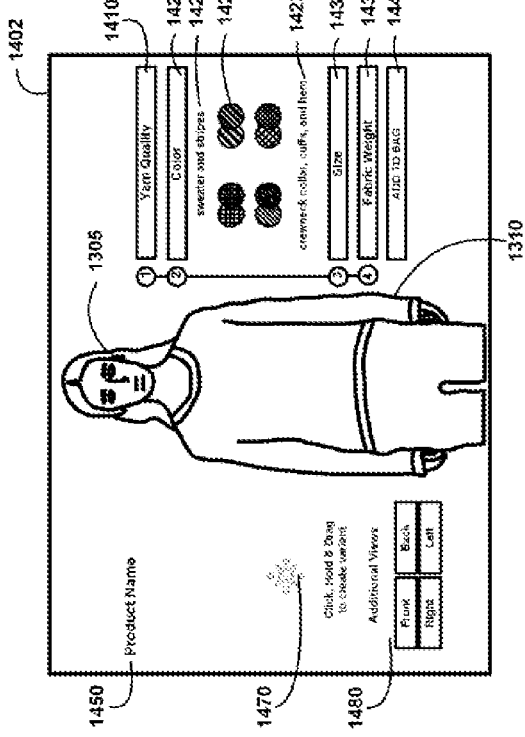

FIG. 12B illustrates an example of a color selection page 400 according to an embodiment. Shown is the consumer selected apparel style #100 1310. The consumer can select different colors, other than a default color scheme, for the selected apparel style #100 1310 with the yarn quality 1410 customization selected. There may be different colors for different yarn types or quality. Customizations for color 1420 include colors for a sweater and stripes 1421 including base and complimentary color selections 1422 and additional different colors for garment trim elements including crewneck collar, cuffs, and hem 1423 colors, if the consumer desires. After the consumer chooses the selection or feature for the knitted product, in one embodiment, the selection may be reflected in the knitted product on the avatar body 1305.

FIG. 12C illustrates an example of trim color selections 1402 according to an embodiment. The trim color selections 1402 are for the consumer style selection apparel style #100 1310. The yarn quality 1410 and color 1420 selections for sweater and stripes 1421, including default base and complimentary color selections 1422, are available. The crewneck collar, cuffs, and hem trim color selections 1423 include crewneck collar, cuffs, and hem trim color selections 1424. The trim color selections may be limited by yarn type, yarn quality, and colors previously selected. After the consumer chooses the selection or feature for the knitted product, in one embodiment, the selection may be reflected in the knitted product on the avatar body 1305.

Figures 12D, 12E:
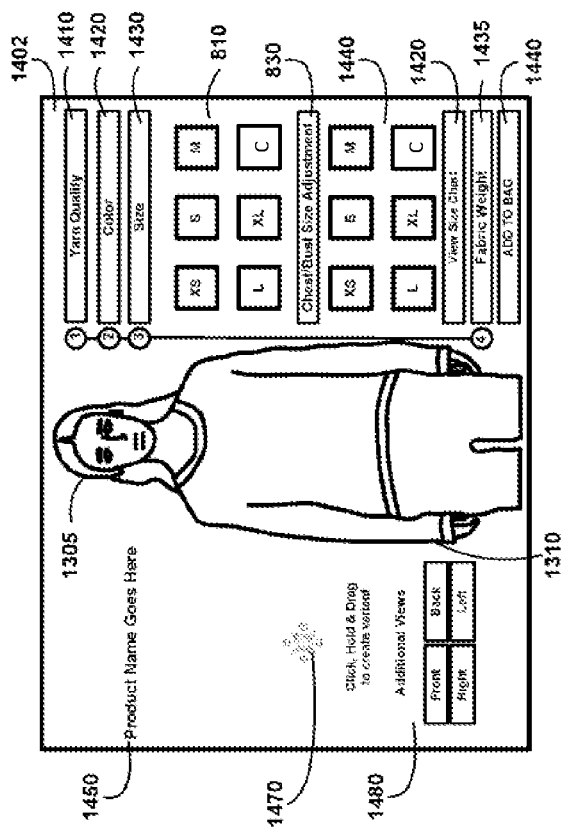

FIG. 12D illustrates an example of size selection page 1400 according to an embodiment. Consumer customizations in addition to yarn quality 1410 and color 1420 include the size 1430 customizations for the apparel style #100 1310. The size and fit of the knitted product may have default selections predetermined by the designer or design style. However, the user may select different sizes as desired. Size selections 1432 may include, but are not limited to, XS, S, M, L, XL AND C (custom). The consumer may wish to view size chart 1434 to clearly understand size equivalents. Selecting the "C" (custom) option causes retrieval of the digital representation of the consumer produced from a previous scan, or, if no previous scan exists, invites the consumer to undergo a scan as discussed above. As indicated above, the scan may produce a 3D point cloud data set representing the consumer, and that data set can be processed to produce a polygonal mesh. In other cases, 2D scan data in the form of images may be captured, and the image data converted to the digital representation of the consumer. Optionally, the scan data may be augmented by surface fitting algorithms to produce a smooth surface digital representation of the consumer. Using the digital representation of the consumer, a plurality of measurements that correspond to locations of pattern elements of the digital pattern for the selected garment are extracted. For each of the measurements extracted from the digital representation of the consumer, a stitch count for a corresponding one of the pattern elements specified by the digital pattern representing the garment is automatically produced by scaling the stitch count called for by the pattern according to the extracted measurements and specified wales and courses densities for the material(s) from which the garment is to be made, to adjust a shape and fit of the article to a shape and size of the consumer's body. The result is a digital pattern representing the garment which is customized to the consumer.

After the consumer chooses the size, selection and/or feature for the knitted product, in one embodiment, the selection may be reflected in the knitted product on the avatar body 1305. For example, a dimensionally-accurate three-dimensional representation of the custom-fit version of the garment according to the digital pattern representing the garment may be displayed on the avatar. Further, as style and fit preferences for the garment are varied through user interaction with the screen options, the digital pattern representing the garment which is customized to the consumer is iteratively updated and the dimensionally-accurate 3D representation of the garment varied on-screen accordingly. This interaction and adjustment results in a final digital pattern of the garment being produced, e.g., once the user is satisfied with the displayed representation of the garment. For example, variations of the style and fit preferences for the garment (which can include variation of the specified material from which the garment is to be knitted) may be accounted for in the final digital pattern of the article through modifications of the stitch counts for the pattern elements specified by the digital pattern representing the garment. Examples of consumer style and fit customizations are discussed below.

FIG. 12E illustrates an example of chest/bust size adjustment page 1402 according to an embodiment. The scan, as described herein, may give the user a default chest/bust size. However, the consumer may adjust the fit. Size customizations can include a broader body type, for example the athletic male who has a larger chest but narrow waist, women with larger bust to waist proportions, to create a customization that affords them a more tapered fit rather than having to select larger sizes to accommodate the top while being baggy around the waist. The consumer may also select a chest/bust size adjustment 1438. Chest/bust size adjustment selections 1439 may include XS, S, M, L, XL AND C (custom) and the consumer may wish to view size chart 1434 to check sizing equivalents. After the consumer chooses the chest size adjustment, in one embodiment, the adjustment may be reflected in the avatar body 1305.

Figures 12F, 13B:
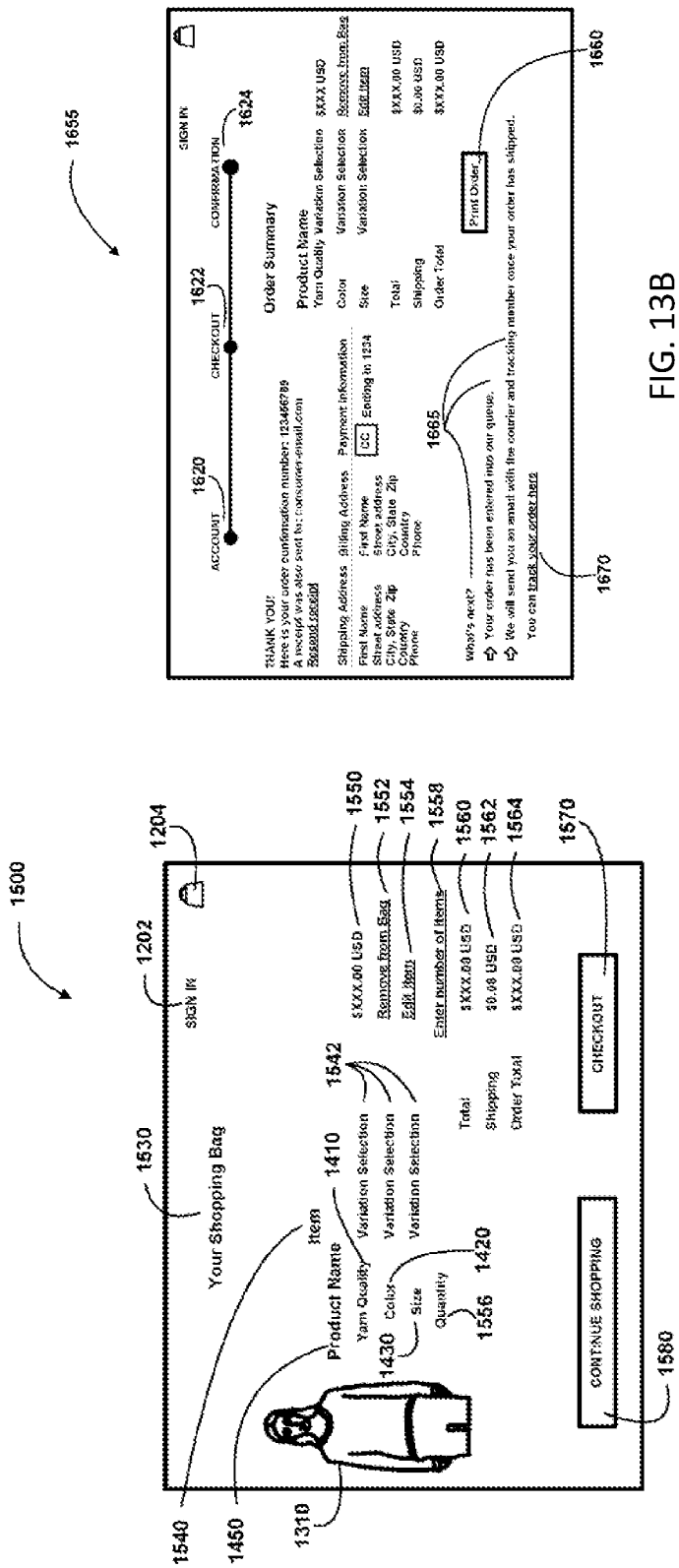

FIG. 12F illustrates an example of shopping bag page 1500 according to an embodiment. The shopping bag page 1500 includes the sign in 402 and shopping bag icon 404. A shopping bag 1530 page displays the apparel style #100 1310 under item 1540, a product name 1541, in this example product name #100 1312, and a customization selection 1542 for yarn quality 1410, color 1420, and size 1430 for each consumer customization selection. The shopping bag page 1500 also provides a quantity 1556 selections where the consumer can enter number of items 1558 for a particular selection for example a group wanting to dress alike. The shopping bag page 1500 displays an item price $xxx.00 USD 1550. The consumer is given the opportunity to remove from bag and/or edit item. A total $xxx.00 USD 1560 for the garment including shipping $0.00 USD 1562 and an order total $xxx.00 USD 1564. The consumer can select to checkout 1570 and also to continue shopping 1580 according to an embodiment.

Figure 13C:
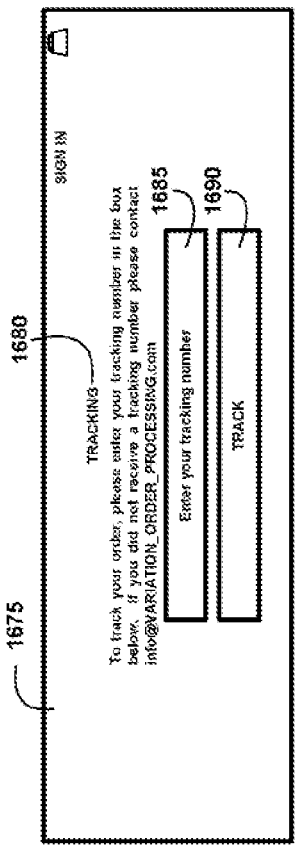
Figure 13A:
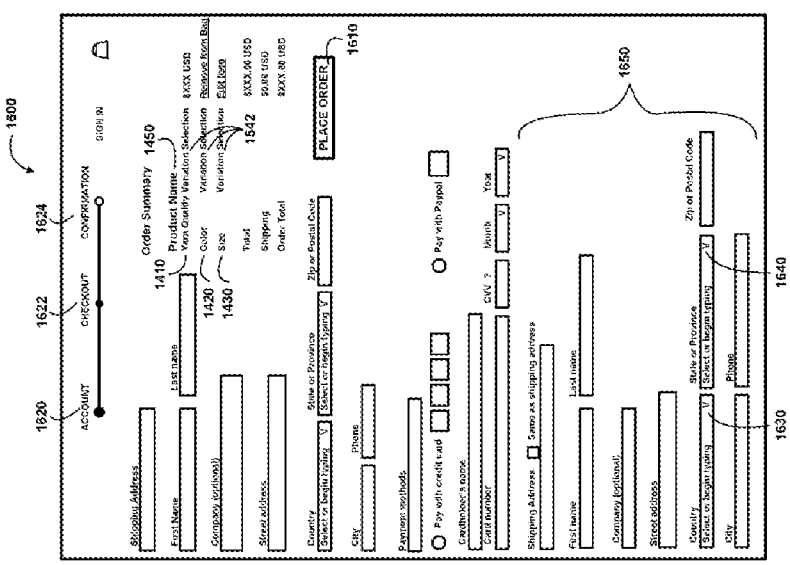

FIG. 13A illustrates an example of order placement page 1600 according to an embodiment. The order page 1600 that includes the login selection 402 and the shopping bag icon 404. An ordering status is shown that includes account 1620, checkout 1622 and confirmation 1624 for consumer awareness of the current ordering position. The place order page 1600 automatically populates the display with the product name 1450, yarn quality 1410, color 1420, size 1430 and customization selection 1542 for each. The place order page 1600 is also showing the prices, consumer personal data, which is populated from the recorded consumer account data. Input areas are available for consumer payment data 1650 including a country dropdown entry 1630 and state or province dropdown entry 1640. When completed the consumer can select to place order 1610 according to an embodiment.

FIG. 13B shows a block diagram of an overview of order confirmation page 1655 according to an embodiment. The order confirmation page 1655 also shows the sign in 402, shopping bag icon 404 and ordering status account 1620, checkout 1622, and confirmation 1624. The order confirmation page 1655 is showing the consumer payment data populated with account data. The consumer may select to print order 1660. The order confirmation page 1655 also provides consumer guidance on next steps 1665 including order and parcel tracking numbers once shipped. The consumer may select to track the order at 1670 to follow the order status according to an embodiment.

FIG. 13C illustrates an example of order tracking page 1675 according to an embodiment. The order-tracking page 1675 provides the consumer the opportunity of tracking their order. The consumer may enter the tracking number at button 1685 and select track 1690 to receive a current status of the order according to an embodiment.

Figures 13D, 15:
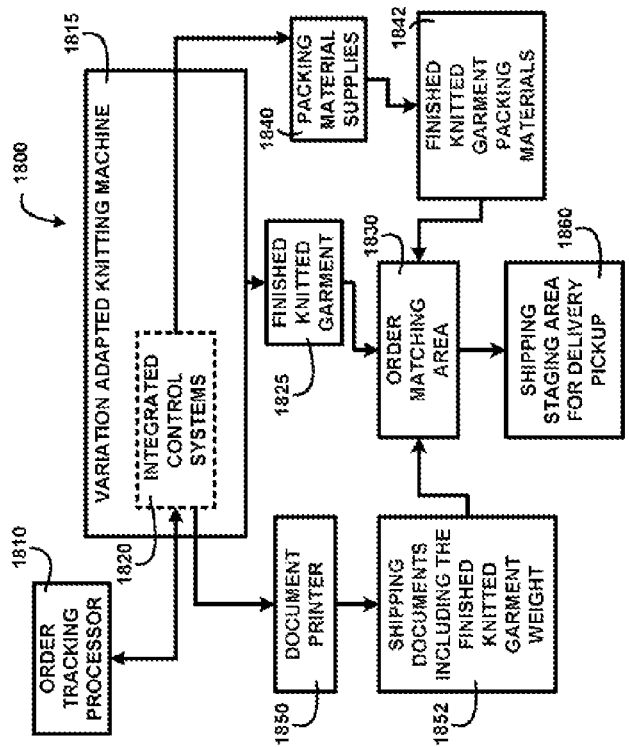

FIG. 13D illustrates an example of order history page 1692 according to an embodiment. The order history page 1692 displays previous orders including any current order that has been placed showing an order no. 1694, order date 1696, total 1697, and status 1698 according to an embodiment.

FIG. 14A illustrates an example of consumer customizations process 1700 according to an embodiment. The process includes a consumer making customizations at 1702. The consumer making style selection 1704 and choosing size selection 1706 begins the order processing with searching matching style and size predetermined pattern files from the order-processing server at 1708. Downloading style follows the style and size search and size predetermined pattern files at 1710, and recording customization data files in an order master instructions folder at 1712.

After customization selections are made at 1702, the yarn feeders are defined at 1714, as are the needles at 1716. The yarn tensioning is defined at 1718, according to embodiments. These customization data files are recorded in an order master instructions folder at 1712. The customization data files are used for determining knitting machine settings and equipment that influence the fabric structure using the order-processing server.

The order processing server calculates and processes data for selecting tension disk settings at 1722, selecting needles and machine gauge at 1724, selecting creel yarn spindles and yarn feeders, disk drums, and pattern wheels at 1732. The order processing server 110 calculates and processes data for determination of fabric shrinkage and control settings to control shrinkage at 1728, for determination of finished garment weight in grams per square meter (GSM) at 1730, for determination of finished garment packing size and materials at 1734, and for determination of shipping documents at 1726 according to an embodiment. The processing is further described in FIG. 14B.

FIG. 14B illustrates the continued example of the integrated control system format and code according to an embodiment. The process may continue at converting knitting machine settings and equipment variation instruction data into production variation or customization instructions at 1736. The process then may configure production customization instructions into customization adapted knitting machine integrated control system format and code at 1738. The customization adapted knitting machine integrated control system format and code is providing the actions needed within the customization adapted knitting machine software to create the production ready file at 1740, according to an embodiment.

FIG. 15 illustrates an example of finished customization garment processing flow chart 1800 according to an embodiment. The order tracking processor 1810 may transmit processing data to the integrated control system 1820. The integrated control system 1820 instructs customization adapted knitting machine 1815 on the actions needed within the customization adapted knitting machine to create the consumer selected customization garment. The knitted garment when completed is conveyed through a finished knitted garment outlet from the knitting machine 1815. A finished knitted garment 1820 can be manually or automatically conveyed to an order matching area 1830. The order tracking processor 1810 upon knitted garment production completion instructs the integrated control system 1820 on the packing material supplies 1840 that have been determined. Finished knitted garment packing materials 1842 can be manually or automatically conveyed to the order matching area 1830. The order tracking processor 1810 can instruct the integrated control system 1820 with a coupled document printer 1850 to print shipping documents including the finished garment weight 1852. The printed shipping documents can manually or automatically be conveyed to the order matching area 1830. The completed finished garment packing and shipping documentation is followed by manually or automatically conveyed the finished knitted garment package to a shipping staging area for delivery pick-up 1860 according to an embodiment.

In another embodiment the finished knitted garment 1820 can be folded using an automatic folding device. The finished knitted garment 1820 can be wrapped and placed in for example a packing box automatically using an automated packing device. The shipping documents including the finished knitted garment weight 1852 can be affixed to the shipping package automatically and automatically placed on for example a conveying device and conveyed to the shipping staging area for delivery pick-up 1860.

Figure 16:
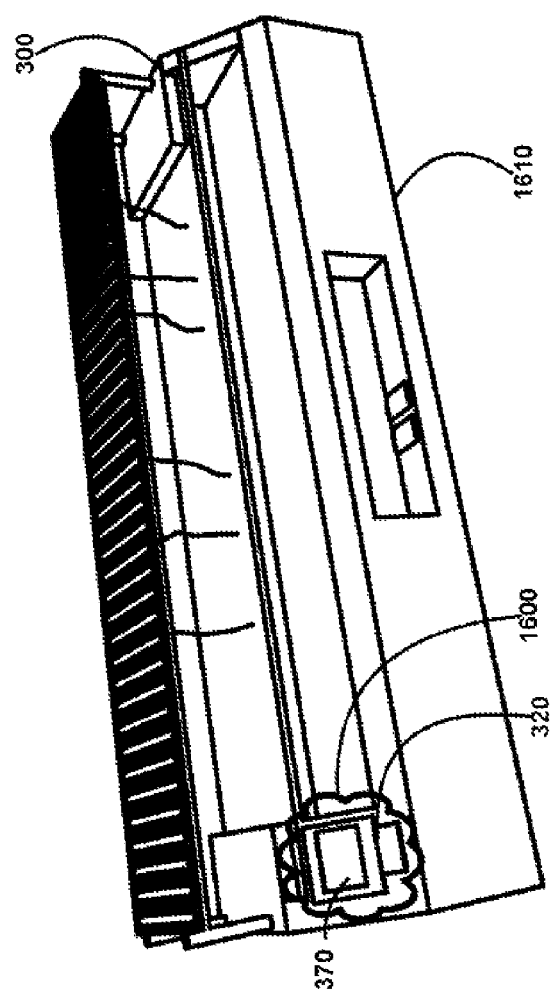
FIG. 16 illustrates an example of an integrated control systems adaptation device according to an embodiment of the present invention.

FIG. 16 illustrates an example of an integrated control systems adaptation device according to an embodiment. FIG. 16 shows the knitting machine 300 with the integrated control system 320 and the monitor 370. The integrated control system 320 and the monitor 370 are integrated into a case to create an integrated control systems adaptation device 1600. The integrated control systems adaptation device 1600 can be paired with the knitting machine 300 to create a variation adapted knitting machine 1610 of one embodiment.

In one embodiment an apparatus includes at least one variation order processing server 1010 is configured to include at least one communication device coupled to at least one knitted textile consumer variation website 1002, at least one production variation instruction data converter processor 1042, at least one variation adapted knitting machine integrated control systems 1050, at least one order tracking processor 1030, at least one internet communication device 1006, a scanner, and at least one integrated control systems adaptation device 1600, and at least one integrated knitted textiles variation ecommerce web application 1102 is configured to be coupled to at least one consumer internet communication device 1006 for communicating with the at least one knitted textile consumer variation website 1002. The at least one variation order processing server 1010 is configured for determining a size predetermined pattern fit using a thermal scanned image heat signature outline of the entity overlaid in a display with the knitted garment size selection for a consumer to make a final size selection, and configured for searching style and size predetermined pattern files matching consumer style and variation selections, downloading and recording matching style and size predetermined pattern files and variation data files in a variation order master instructions folder. The at least one variation order processing server 1010 is configured for calculating and processing variation selection data for defining, selecting and determining variation adapted knitting machine 1610 production equipment and settings. The at least one communication device is configured to include a desktop computer, and a wireless communication device 1120 including a laptop computer, smart phone, and a tablet. The at least one knitted textile consumer variation website 1002 is configured for processing variation knitted garment orders and production. The at least one production variation instruction data converter processor 1042 is configured for converting consumer variation selections into adapted knitted machine instructions. The at least one variation adapted knitting machine integrated control systems 1050 is configured for integration into at least one integrated control systems adaptation device 1600 for adapting multiple types knitting machines CNC accessories paired with the integrated control systems 1050 to create one or more variation adapted knitting machine 1610, wherein the at least one variation adapted knitting machine integrated control systems 1050 is configured for receiving and transmitting converted consumer style and variation selections production variation instruction data coded operating instructions to a variation adapted knitting machine 1610 for production of variation finished knitted garments. The at least one order tracking processor 1030 is configured for tracking and sequencing variation order processing throughout the production processing including placing the order on a production queue, transmitting production instructions to a variation adapted knitting machine 1610 when the variation order reaches top position on the production queue. The at least one order tracking processor 1030 is configured for transmitting packing instructions when a production completion signal is received, transmitting shipping instructions when a packing completion signal is received and recording a courier tracking number when an order shipped signal is received. The at least one integrated knitted textiles variation ecommerce web application 1102 is configured for consumer use in selecting knitted garment variations and ordering on the knitted textile consumer variation website 1002.

In another embodiment an apparatus includes at least one production variation instruction data converter processor 1042 is configured to be coupled to at least one variation order processing server 1010 for converting production variation instructions into adapted knitted machine instructions. The at least one production variation instruction data converter processor 1042 is configured for converting consumer variation selections scan into adapted knitted machine instructions including integrated control systems format and code 1154. The at least one production variation instruction data converter processor 1042 is configured for converting consumer variation selections into adapted knitted machine instructions including actions needed within variation adapted knitting machine software including calculating and processing variation selection data for defining, selecting and determining variation adapted knitting machine 1610 production equipment and settings including creel yarn spindles and yarn feeders, needles, yarn tensioning, tension disk settings, machine gauge, disk drums, pattern wheels, fabric shrinkage and control settings to control shrinkage and recording results in a variation order master instructions folder to create a production ready file. The at least one production variation instruction data converter processor 1042 is configured for calculating and processing variation selection data for defining, selecting and determining a variation finished knitted garment weight in grams per square meter and a shipping weight in pounds, a variation finished knitted garment packing size and materials and a variation finished knitted garment shipping documents. The at least one variation order processing server 1010 is configured for receiving and processing consumer selections of knitted garment variations and orders from a knitted textile consumer variation website 1002.

In yet another embodiment an apparatus includes at least one integrated control systems adaptation device 1600 is configured to include at least one integrated control systems 1050 and configured to be coupled with at least one adapted knitting machine 1610 for operating according to adapted knitted machine instructions to produce a consumer selected variations knitted garment. The at least one integrated control systems adaptation device 1600 is configured to include at least one integrated control systems including at least one variation adapted knitting machine integrated control systems 1050. The at least one integrated control systems adaptation device 1600 is configured for adapting multiple types knitting machines CNC accessories paired with the at least one integrated control systems to create one or more variation adapted knitting machine 1610. The at least one integrated control systems adaptation device 1600 is configured to include at least one integrated control systems, wherein the at least one integrated control systems is configured for receiving and transmitting converted consumer style and variation selections production variation instruction data coded operating instructions to a variation adapted knitting machine 1610 for production of variation finished knitted garments. The at least one integrated control systems adaptation device 1600 is configured to include at least one integrated control systems, wherein the at least one integrated control systems is configured to include adapted knitted machine instructions including actions needed within one or more variation adapted knitting machine software including variation selection data for defining, selecting and determining variation adapted knitting machine 1610 production equipment and settings.

Thus, processes for producing a custom-fit version of a knitted article have been described. Although embodiments of the invention have been described with reference to specific examples, it should be evident that various modifications and changes may be made to these examples without departing from the broader spirit and scope of embodiments described herein.

What is claimed is:
1. A method of producing a custom-fit version of a knitted article, the method comprising:
    extracting, from a digital representation of an object for which said knitted article is to be produced, a plurality of measurements corresponding to locations of pattern elements of a digital pattern for said knitted article;
    for each of the plurality of measurements extracted from the digital representation of the object, automatically adapting a stitch count for a corresponding one of the pattern elements specified by the digital pattern for said knitted article by scaling said stitch count according to the extracted measurement and specified wales and courses densities for a specified material to fit the knitted article to the object, thereby producing a digital pattern representing the knitted article which is customized to the object for the specified material;
    iteratively updating the digital pattern representing the knitted article which is customized to the object for the specified material as style and fit preferences for the knitted article are varied through user interaction with the digital representation of the object to produce a final digital pattern of the knitted article;
    automatically producing, from the final digital pattern of the knitted article, machine instructions representing one or more pattern pieces to be knitted on a computerized knitting machine to create the custom-fit version of the knitted article by converting stitch counts of the final digital pattern of the knitted article to knitting sequences for the computerized knitting machine; and manufacturing the custom-fit version of the article by the computerized knitting machine according to the machine instructions.

2. The method of producing the custom-fit version of the knitted article of claim 1, further comprising displaying a dimensionally-accurate three-dimensional representation of the custom-fit version of the article according to the digital pattern representing the knitted article during said iterative updating of the digital pattern representing the knitted article.

3. The method of producing the custom-fit version of the knitted article of claim 1, wherein variations of the style and fit preferences for the knitted article are accounted for in the final digital pattern of the knitted article through modifications of the stitch counts for the pattern elements specified by the digital pattern representing the knitted article.

4. The method of producing the custom-fit version of the knitted article of claim 3, wherein the variations of the style and fit preferences for the knitted article include variation of the specified material.

5. The method of producing the custom-fit version of the knitted article of claim 4, wherein the variation of the specified material is accounted for in the final digital pattern of the knitted article through modifications of the stitch counts for the pattern elements specified by the digital pattern representing the knitted article according to updated wales and courses densities for newly specified materials.

6. The method of producing the custom-fit version of the knitted article of claim 1, further comprising updating the digital pattern representing the knitted article which is customized to the object as adornment preferences for the knitted article are varied through user interaction with the digital representation of the object to produce the final digital pattern of the knitted article.

7. The method of producing the custom-fit version of the knitted article of claim 6, wherein the adornment preferences include some or all of: hardware placement; embroidery selection; and embroidery placement.

8. The method of producing the custom-fit version of the knitted article of claim 1, further comprising superimposing a motif on the digital pattern representing the knitted article, wherein the machine instructions representing the one or more pattern pieces include instructions for yarn colors and stitch type to accommodate said motif.

9. The method of claim 8, wherein iteratively updating the digital pattern representing the knitted article includes altering the motif superimposed on the digital pattern representing the knitted article according to the user interaction with the digital representation of the object.

10. The method of claim 8, wherein the motif is displayed via a dimensionally-accurate three-dimensional representation of the custom-fit version of the knitted article in colors compatible with capabilities of the computerized knitting machine.

11. The method of producing the custom-fit version of the knitted article of claim 1, wherein automatically adapting stitch counts for corresponding ones of the pattern elements specified by the digital pattern representing the knitted article includes forcing the stitch counts to odd or even numbers of stitches according to capabilities of the computerized knitting machine.

12. The method of producing the custom-fit version of the knitted article of claim 1, wherein the digital representation of the object is created from a scan of the object.

13. The method of producing the custom-fit version of the knitted article of claim 1, wherein the digital representation of the object is retrieved from a stored object profile.

14. A method of producing a custom-fit version of an article, the method comprising:

extracting, from a digital representation of an object for which said article is to be produced, a plurality of measurements corresponding to locations of pattern elements of a digital pattern for said article;

for each of the plurality of measurements extracted from the digital representation of the object, automatically adapting a stitch count and density for a corresponding one of the pattern elements specified by the digital pattern for said article by scaling said stitch count and density for a specified material according to the extracted measurement to fit the article to the object, thereby producing a digital pattern representing the article which is customized to the object for the specified material;

iteratively updating the digital pattern representing the article which is customized to the object for the specified material as style and fit preferences for the article are varied through user interaction with the digital representation of the object to produce a final digital pattern of the article;

automatically producing, from the final digital pattern of the article, machine instructions representing one or more pattern pieces to be manufactured on a computerized machine to create the custom-fit version of the article by converting stitch counts and densities of the final digital pattern of the article to manufacturing sequences for the computerized machine; and manufacturing the custom-fit version of the article by the computerized machine according to the machine instructions.

15. The method of producing the custom-fit version of the article of claim 14, wherein variations of the style and fit preferences for the article are accounted for in the final digital pattern of the article through modifications of the stitch counts and densities for the pattern elements specified by the digital pattern representing the article.

16. The method of producing the custom-fit version of the article of claim 15, wherein the variations of the style and fit preferences for the article include variation of the specified material.

17. The method of producing the custom-fit version of the article of claim 16, wherein the variation of the specified material is accounted for in the final digital pattern of the article through modifications of the stitch counts and densities for the pattern elements specified by the digital pattern representing the article according to updated stitch counts and densities for newly specified materials.

18. The method of producing the custom-fit version of the article of claim 14, further comprising updating the digital pattern representing the article which is customized to the object as adornment preferences for the article are varied through user interaction with the digital representation of the object to produce the final digital pattern of the article.

19. The method of producing the custom-fit version of the article of claim 18, wherein the adornment preferences include some or all of: hardware placement; embroidery selection; and embroidery placement.

20. The method of producing the custom-fit version of the article of claim 14, further comprising superimposing a motif on the digital pattern representing the article, wherein the machine instructions representing the one or more pattern pieces include instructions for material colors and manufacturing technique to accommodate said motif.

* * * * *